United States Patent
Hayashi et al.

(10) Patent No.: US 7,334,473 B2
(45) Date of Patent: Feb. 26, 2008

(54) STRUCTURES FOR SUPPORTING VIBRATORS AND DEVICES FOR MEASURING PHYSICAL QUANTITIES

(75) Inventors: Shigeki Hayashi, Ama-Gun (JP); Takayuki Kikuchi, Nagoya (JP); Yusuke Kinoshita, Kamiina-Gun (JP)

(73) Assignees: NGK Insulators, Ltd., Nagoya (JP); Seiko Epson Corporation, Shinjuku-Ku (JP)

(*) Notice: Subject to any disclaimer, the term of this patent is extended or adjusted under 35 U.S.C. 154(b) by 77 days.

(21) Appl. No.: 11/214,455

(22) Filed: Aug. 29, 2005

(65) Prior Publication Data

US 2006/0053883 A1    Mar. 16, 2006

(30) Foreign Application Priority Data

Sep. 10, 2004 (JP) .................... 2004-263310
Jul. 15, 2005 (JP) .................... 2005-207047

(51) Int. Cl.
*G01P 9/04* (2006.01)

(52) U.S. Cl. .................... 73/504.12; 310/351

(58) Field of Classification Search ............ 73/504.12, 73/504.14; 310/351

See application file for complete search history.

(56) References Cited

U.S. PATENT DOCUMENTS 6,698,292 B2* 3/2004 Kikuchi ............... 73/504.12

7,000,472 B2* 2/2006 Kinoshita ............ 73/504.12
2003/0141340 A1 7/2003 Ishikawa et al.
2004/0226978 A1 11/2004 Ishikawa et al.

FOREIGN PATENT DOCUMENTS

| JP | 2001-012955 | 1/2001 |
| JP | 2003-028648 | 1/2003 |
| JP | 2003-294450 | 10/2003 |

OTHER PUBLICATIONS

U.S. Appl. No. 11/215,767, filed Aug. 30, 2005, Hayashi et al.

* cited by examiner

*Primary Examiner*—John E. Chapman
(74) *Attorney, Agent, or Firm*—Burr & Brown

(57) ABSTRACT

A structure for supporting a vibrator 1 is provided. The structure comprises a substrate 12 and bonding wires 14A, 14B fixed to the substrate 12 and connected with the vibrator 1. The vibrator 1 is supported with the bonding wires so that the vibrator 1 is not directly contacted with the substrate 12. "fd" and "fw" satisfy the following formula (1). "fd" represents a resonance frequency of a driving vibration mode of the vibrator and "fw" represents a characteristic frequency of a vibration mode of the bonding wire at room temperature.

$$(fd/2) \times 1.05 \leq fw, \text{ or, } fw \leq (fd/2) \times 0.95. \tag{1}$$

6 Claims, 23 Drawing Sheets

STRUCTURES FOR SUPPORTING VIBRATORS AND DEVICES FOR MEASURING PHYSICAL QUANTITIES

This application claims the benefits of Japanese Patent Applications P2005-207047 filed on Jul. 15, 2005, and P2004-263310 filed on Sep. 10, 2004, the entireties of which are incorporated by reference.

BACKGROUND OF THE INVENTION

1. Field of the Invention

The present invention provides a structure for supporting a vibrator and a device for measuring a physical quantity such as a vibratory gyroscope.

2. Related Art Statement

In a vehicle control system, a vibratory gyroscope and its vibrator are subjected to a wide temperature range including high and low temperatures. Such temperature range normally includes minus 40° C. to plus 85° C. and may be wider in applications that operate outside the normal temperature range. Particularly when a vibrator is made of a piezoelectric single crystal, the temperature dependency of the single crystal may affect the stability of the gyroscope.

Japanese patent publication 2003-28648A discloses a member for supporting a vibrator for use in a vibratory gyroscope. According to the disclosure, the supporting member is composed of an elongate rod bent in a complex form so that the vibrator is supported with the rod. It is also described that the supporting member is electrically connected with an electrode formed on the vibrator.

Further, the assignee has filed Japanese patent publication 2003-294450A and disclosed that a vibrator is supported with bonding wires over a substrate in a package. The bonding wires are bonded with electrodes on the surface of the vibrator.

SUMMARY OF THE INVENTION

According to such supporting methods, however, a substantial temperature drift may be observed, for example, in a high temperature region. For example, as shown in FIG. 3, even when the zero point temperature signal is constant in low to room temperature range, the gyroscope signal may be rapidly increased in a range of 60 to 80° C. to result in temperature drift. If the vibrator exhibiting abnormality of oscillation would be used for a vibratory gyroscope, the zero point temperature drift in the detection signal would be increased so that the gyroscope might be inoperative as a sensor in the worst cases.

An object of the present invention is to provide a supporting structure for a device of measuring a physical quantity using a vibrator for reducing the zero point temperature drift of the detection signal.

The present invention provides a structure for supporting a vibrator. The structure includes a substrate and a bonding wire fixed to the substrate and connected with a vibrator. The vibrator is supported with the bonding wire so that the vibrator is not directly contacted with the substrate. Additionally, "fd" and any "fw" satisfy the following formula (1), provided that "fd" represents a resonance frequency of a driving vibration mode of the vibrator and "fw" represents a characteristic frequency of a vibration mode of the bonding wire at room temperature.

$$(fd/2) \times 1.05 \leq fw, \text{ or, } fw \leq (fd/2) \times 0.95 \quad (1)$$

The present invention further provides a device for measuring a physical quantity including the supporting structure described above.

The inventors have studied the cause of the peak temperature drift, as shown in FIG. 3, and obtained the following findings. That is, it is found that the characteristic vibration frequency "fw" of a bonding wire on a substrate for packaging may be very close to the half of the resonance frequency "fd/2" of the vibration of the driving vibration mode. The driving vibration mode may cause resonance of the bonding wire so as to affect the vibration mode of the vibrator. The resonance may result in the zero point temperature drift of the vibratory gyroscope. It is found that the zero point temperature drift can be reduced by appropriately changing the form of the bonding wire so that "fw" is made distant by a specific ratio from "fd/2".

These and other objects, features and advantages of the invention will be appreciated upon reading the following description of the invention when taken in conjunction with the attached drawings, with the understanding that some modifications, variations and changes of the same could be made by the skilled person in the art.

BRIEFS DESCRIPTION OF THE DRAWINGS

PREFERRED EMBODIMENTS OF THE INVENTION

Figure 1:
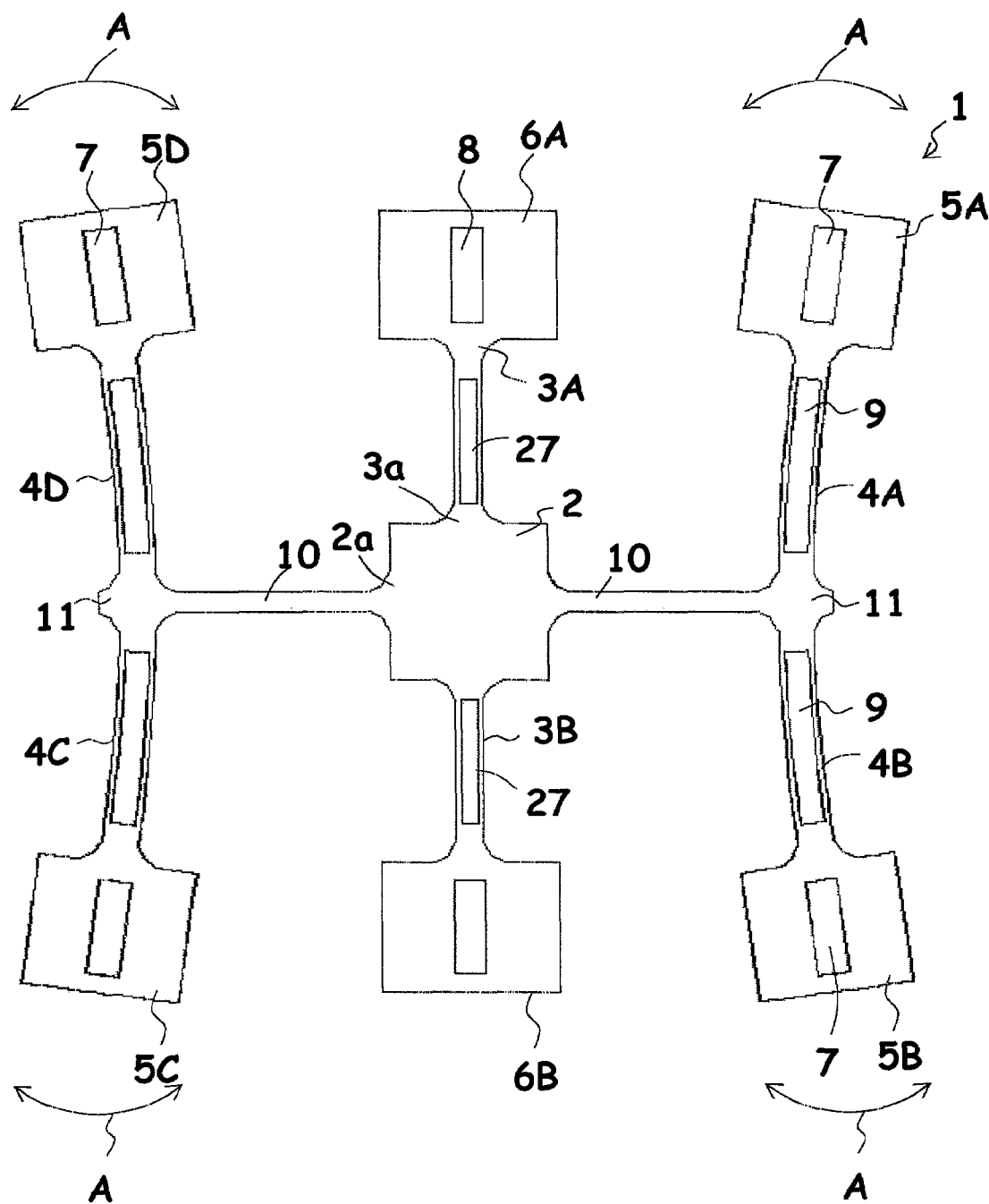
FIG. 1 is a plan view showing the driving vibration mode of a vibrator 1 usable in the present invention.

The characteristic frequency "fw" of a bonding wire at room temperature means the characteristic frequency of a certain vibration mode of the bonding wire at 25° C. "fw" can be measured by means of an impedance analyzer, a laser Doppler measuring system, or X-ray diffraction topograph Lang camera. A plurality of the vibration modes are normally present for the single bonding wire, so that a plurality of the characteristic frequencies "fw" are present for the corresponding vibration modes, respectively. According to the present invention, it is required that all of the single or plural vibration mode(s) of the bonding wire satisfy the formula (1).

The resonance frequency "fd" of the driving vibration mode means the characteristic frequency of driving vibration mode excited in a vibrator by a self-oscillation circuit. "fd" can be measured by means of an impedance analyzer.

"fd/2" and "fw" have to satisfy either of the following formulae of (fd/2)×1.05≦fw and fw≦(fd/2)×0.95. When "fd/2" and "fw" do not satisfy both of the above formulae, the zero point temperature drift of the detection signal becomes considerable. That is, it has been proved that "fd/2" and "fw" have to be different with each other as described above based on the data of deviation of "fw" and the temperature characteristics of vibrators actually fabricated.

In the formula (1), "fw" may be (fd/2)×1.05 or higher and preferably be (fd/2)×1.10 or higher. Alternatively, "fw" may be (fd/2)×0.95 or lower and preferably be (fd/2)×0.90 or lower.

According to a preferred embodiment, "fd" and "fw" further satisfy the following formula.

Formula (2):

$$(2fd) \times 1.03 \leq fw, \text{ or, } fw \leq (2fd) \times 0.97 \qquad (2)$$

That is, it is required that "2fd" and "fw" satisfy either of "(2fd)×1.03≦fw" and fw≦(2fd)×0.97. When "2fd" and "fw" do not satisfy both of the above formulae, the zero point temperature drift of the detection signal becomes considerable. That is, it has been proved that "2fd" and "fw" have to be different with each other as described above based on the data of deviation of "fw" and the temperature characteristics of vibrators actually fabricated.

According to the present embodiment, it is required that all of the single or plural vibration mode(s) of the boding wire satisfy the formula (2).

Moreover, the difference of 0.05 times of (fd/2) between "fd/2" and "fw" was required for reducing the zero point temperature drift of the detection signal in the formula (1). It was further proved that only 0.03 times of (2fd) between "2fd" and "fw"was required for reducing the zero point temperature drift of the detection signal in the formula (2).

Such differences of the ratios of the differences necessary for reducing the temperature drift, among the different frequency ranges, were also beyond the expectations of those skilled in the art.

According to the formula (2), "fw" may be (2fd)×1.03 or higher and preferably be (2fd)×1.05 or higher. Alternatively, "fw" may be (2fd)×0.97 or lower and preferably be (2fd)×0.95 or lower.

According to a preferred embodiment, "fd" and "fw" further satisfy the following formula (3).

Formula (3):

$$(3fd) \times 1.05 \leq fw, \text{ or, } fw \leq (3fd) \times 0.95 \qquad (3)$$

That is, it is required that "3fd" and "fw" satisfy either of "(3fd)×1.05≦fw" and fw≦(3fd)×0.95. When "3fd" and "fw" do not satisfy both of the above formulae, the zero point temperature drift of the detection signal becomes considerable. That is, it has been proved that "3fd" and "fw" have to be different with each other, as described above, based on the data of deviation of "fw" and the temperature characteristics of vibrators actually fabricated.

According to the present embodiment, it is required that all of the single or plural vibration mode(s) of the boding wire satisfy the formula (3).

According to the formula (3), "fw" may be (3fd)×1.05 or higher and preferably be (2fd)×1.10 or higher. Alternatively, "fw" may be (2fd)×0.95 or lower and preferably be (2fd)×0.90 or lower.

Although the requirement of the formula (3) gives less considerable influences compared with the requirements of the formulae (1) and (2), it is desirable to further satisfy the requirement of the formula (3) in addition to those of the formulae (1) and (2) for further reducing the temperature drift of the detection signal.

"fd" can be adjusted by changing the material and dimensions of the vibrator. The design of the vibrator is decided depending on various conditions, however, so that it may be impossible to substantially change the material and dimensions of the vibrator. In this case, "fw" is controlled so that each or all of the formulae (1), (2) and (3).

Although "fw" may be controlled by any method, the followings are listed.

(1) The diameter, thickness or width of the bonding wire is changed in each of bonding wires.

(2) The bonding wire is bent.

(3) The material of a bonding wire is changed.

(4) The length of a bonding wire is changed.

According to a preferred embodiment, a vibrator has a driving vibration arm with a driving means provided therein, a detection vibration arm with a detecting means provided therein, and a base portion provided between the driving and detection vibration arms. Preferably, the vibrator further has an elongate connecting portion connecting the base portion and driving vibration arm. Although the present invention will be described referring to the present embodiment, the present invention is not limited to this type of vibrator.

Figure 2:
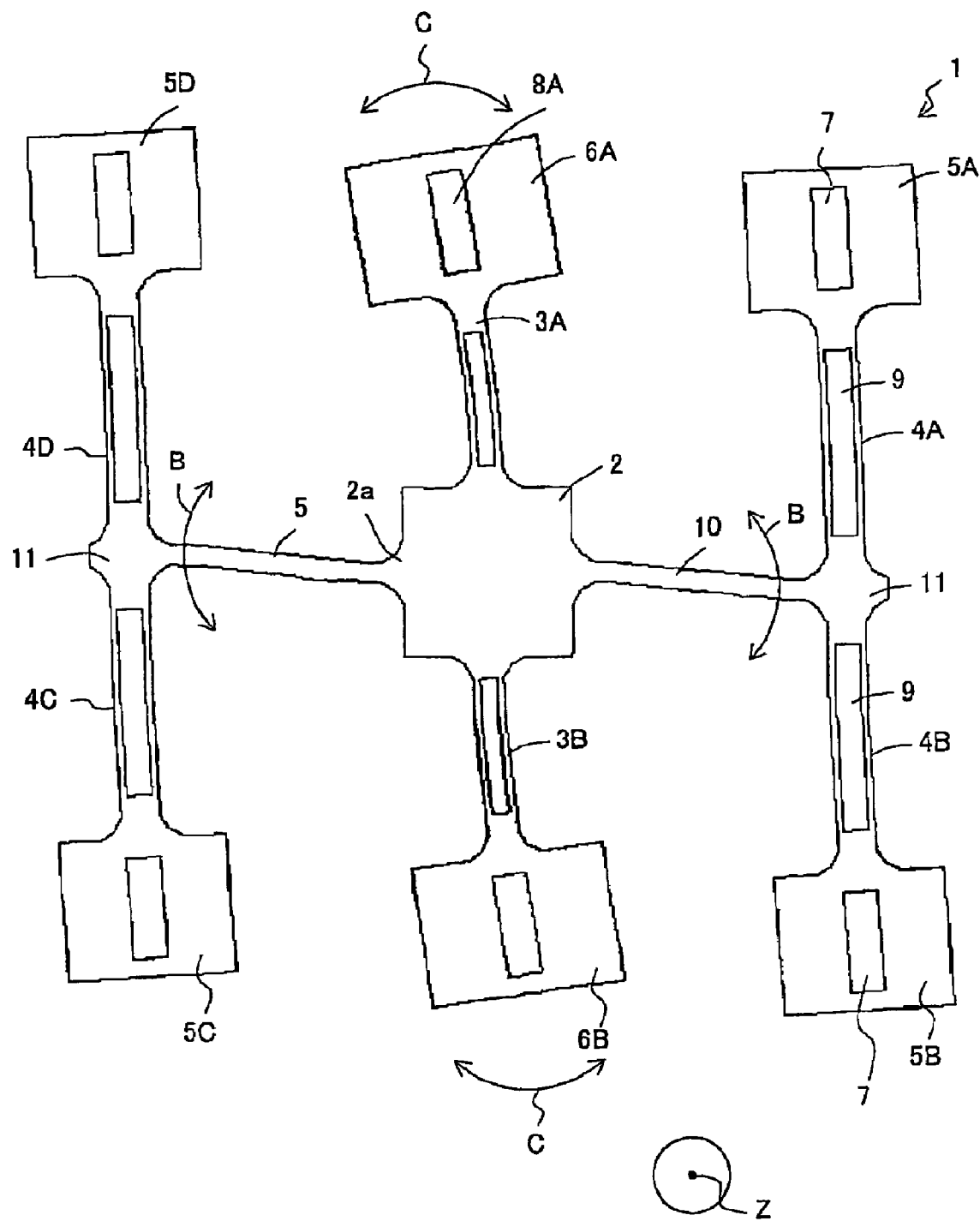
FIG. 2 is a plan view showing the detection vibration mode of a vibrator 1.

FIG. 1 is a plan view schematically showing a vibrator 1 (driving vibration mode) according to an embodiment of the present invention. FIG. 2 is a plan view showing the detection vibration mode of the vibrator 1.

The vibrator 1 according to the present example has a base portion 2, a pair of detection vibration arms 3A and 3B protruding from the base portion 2, a pair of connecting portions 10 each protruding from the base portion 2, and driving vibration arms 4A, 4B 4C and 4D provided at the ends of the connecting portions 10, respectively. An elongate groove is formed in each of the main faces of the driving vibration arms 4A, 4B, 4C and 4D. Each of the driving vibration arms 4A to 4D substantially has a cross sectional shape of "H" character. A driving electrode 9 is formed in the groove. Wide or weight portions 5A, 5B, 5C and 5D are provided at the tip ends of the driving vibration arms 4A to 4D, respectively. Through holes 7 arc formed in the wide portions, respectively.

An elongate groove is formed in each of the main faces of the detection vibration arms 3A and 3B. Each of the detection vibration arms substantially has a cross sectional shape of "H" character. A detecting electrode 27 is formed in the groove. Wide or weight portions 6A and 6B are provided at the tip ends of the detection vibration arms 3A and 3B, respectively. Through holes 8 are formed in the wide portions, respectively.

FIG. 1 shows the driving vibration mode. When driving vibration is excited in the vibrator, each of the driving vibration arms 4A to 4D vibrates around the base 11 of the arm to the connecting portion 10 as its fulcrum, as an arrow "A". The vibrator 1 is rotated around a rotating axis (Z-axis) extending in a direction perpendicular to the vibrator 1. The connecting portion 10 then vibrates in bending vibration mode around the base of the connecting portion 10 to the fixing (base) portion 2 as its fulcrum, as an arrow "B". Responsive to the vibration, each of the detection vibration arms 3A and 3B vibrates in bending vibration mode around the base of the arm 3 to the fixing (base) portion 2, as an arrow "C". Each of the detection vibration arms 3A and 3B generates electrical signal corresponding to the detection vibration. The electrical signal is then utilized to calculate a turning angular rate around the rotating axis (Z axis).

FIG. 5(a) is a plan view schematically showing a supporting structure used for the present invention. FIG. 5(b) is a front view showing a supporting structure of FIG. 5(a).

A central through hole 13A is formed in a substrate 12. According to the present example, the through hole 13A has an elongate shape such as a rectangular shape. The substrate 12 has wider portions 12a provided on the both sides of the through hole 13A and narrower portions 12b. According to the present example, the wider portion 12a is fixed to a package. The vibrator 1 is supported directly over the through hole 13A of the substrate 12. According to the present example, the vibrator is supported with four bonding wires 14A and two bonding wires 14B. Each of the bonding wires protrudes from opposing edges 13a on the wider portion 12a of the substrate 12 towards the base portion 2.

Each of the bonding wires 14A protrudes from each end of each opposing edge 13a and is bent substantially in the planar shape of an "L" character. That is, the bonding wire 14A has a wider portion 14a formed in a direction substantially parallel with the opposing edge 13b facing the through holes 13, a narrower portion 14b, and a bent portion 14c formed in a direction substantially parallel with the opposing edge 13a. The tip end of the bent portion 14c is connected with an electrode formed in the base portion 2.

Further, two bonding wires 14B each protruding from the center of each opposing edge 13a have a wider portion 14a and a narrower portion 14b. The tip end of the narrower portion 14b is joined with the fixing portion 2. According to the present example, each of the bonding wires 14A and 14B has the wider portion 14a and narrower portion 14b, so that the characteristic frequency of the vibration of the whole bonding wire can be controlled. The width of the bonding wire can be easily controlled by, for example, changing the mask width of a mask pattern used for patterning the patterning the bonding wire by etching.

Figure 5:
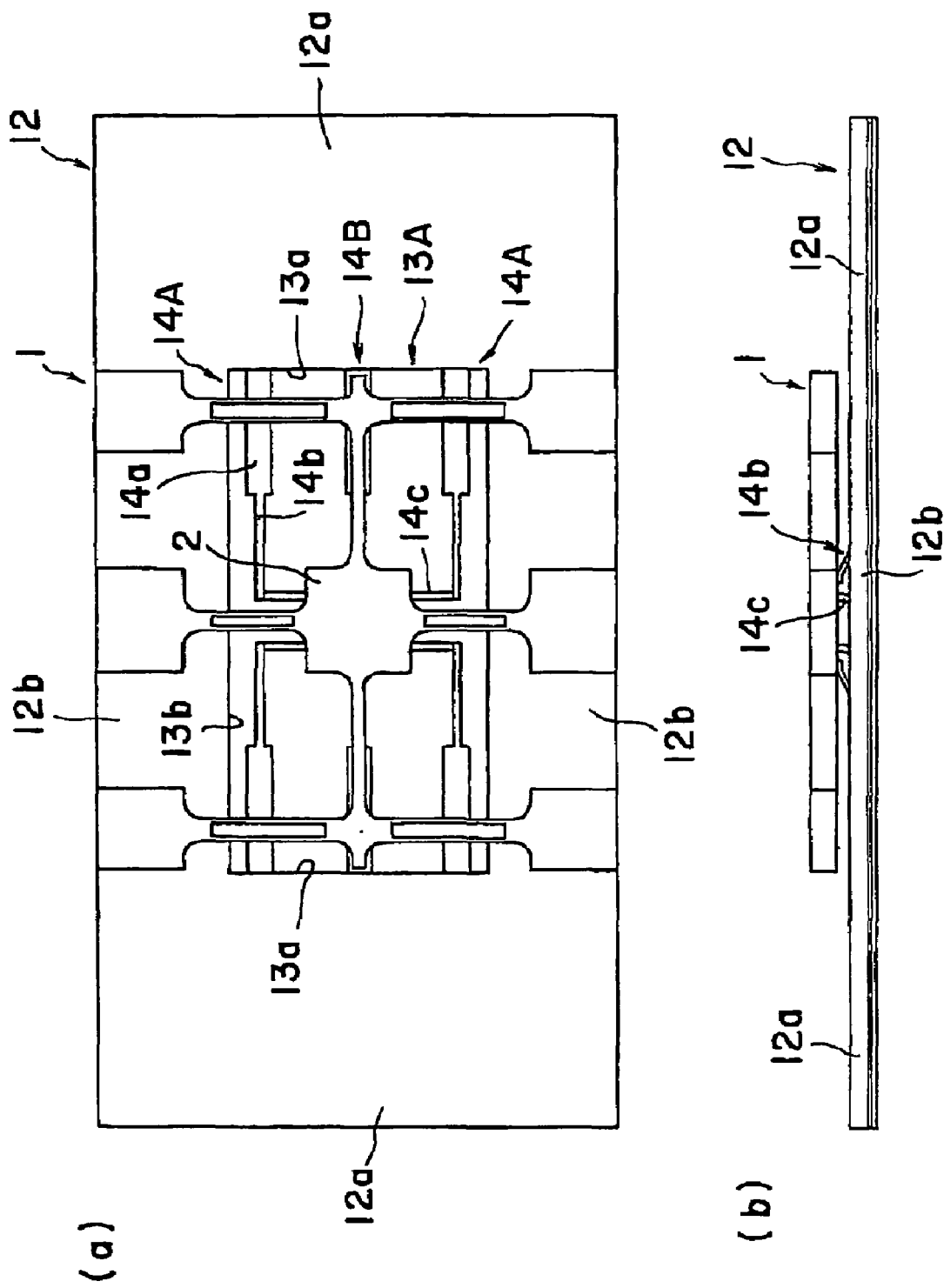
FIG. 5(a) is a plan view schematically showing a supporting structure usable in the present invention.
FIG. 5(b) is a front view showing the supporting structure of FIG. 5(a).
Figure 6:
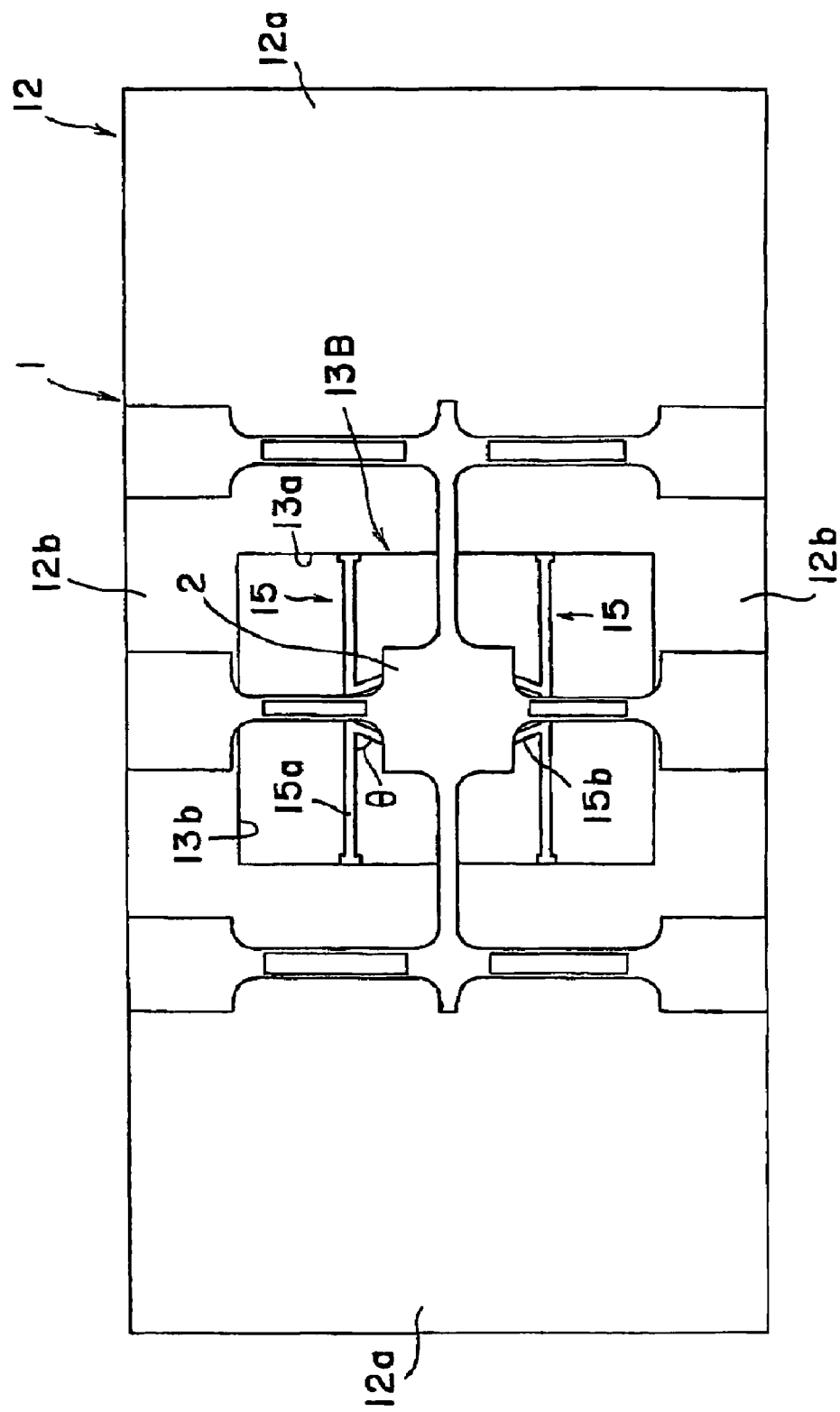
FIG. 6 is a plan view schematically showing a supporting structure according to another embodiment of the present invention.

According to an example shown in FIG. 6, the width of a through hole 13B is made narrower than that of the through hole 13A shown in FIG. 5, so that each bonding wire is made shorter. Such change of the length of the bonding wire results in a change of the characteristic frequency of the vibration of the bonding wire.

According lo the present example, two bonding wires 15 are protruded from each of the opposing edges 13a on the side of the wider portion 12a of the substrate 12 towards the base portion 2. Each bonding wire 15 has a portion 15a extending in a direction substantially parallel with the opposing edge 13b, and a bent portion 15b bent towards the fixing portion 2. The tip end of the bent portion 15b is joined with an electrode on the fixing portion 2. The portions 15a and 15b may intersect each other at an angle "θ" of right angle as shown in FIG. 5 or an acute angle as shown in FIG. 6. The angle "θ" may be thus changed so as to change the characteristic frequency of the whole bonding wire.

Figure 7:
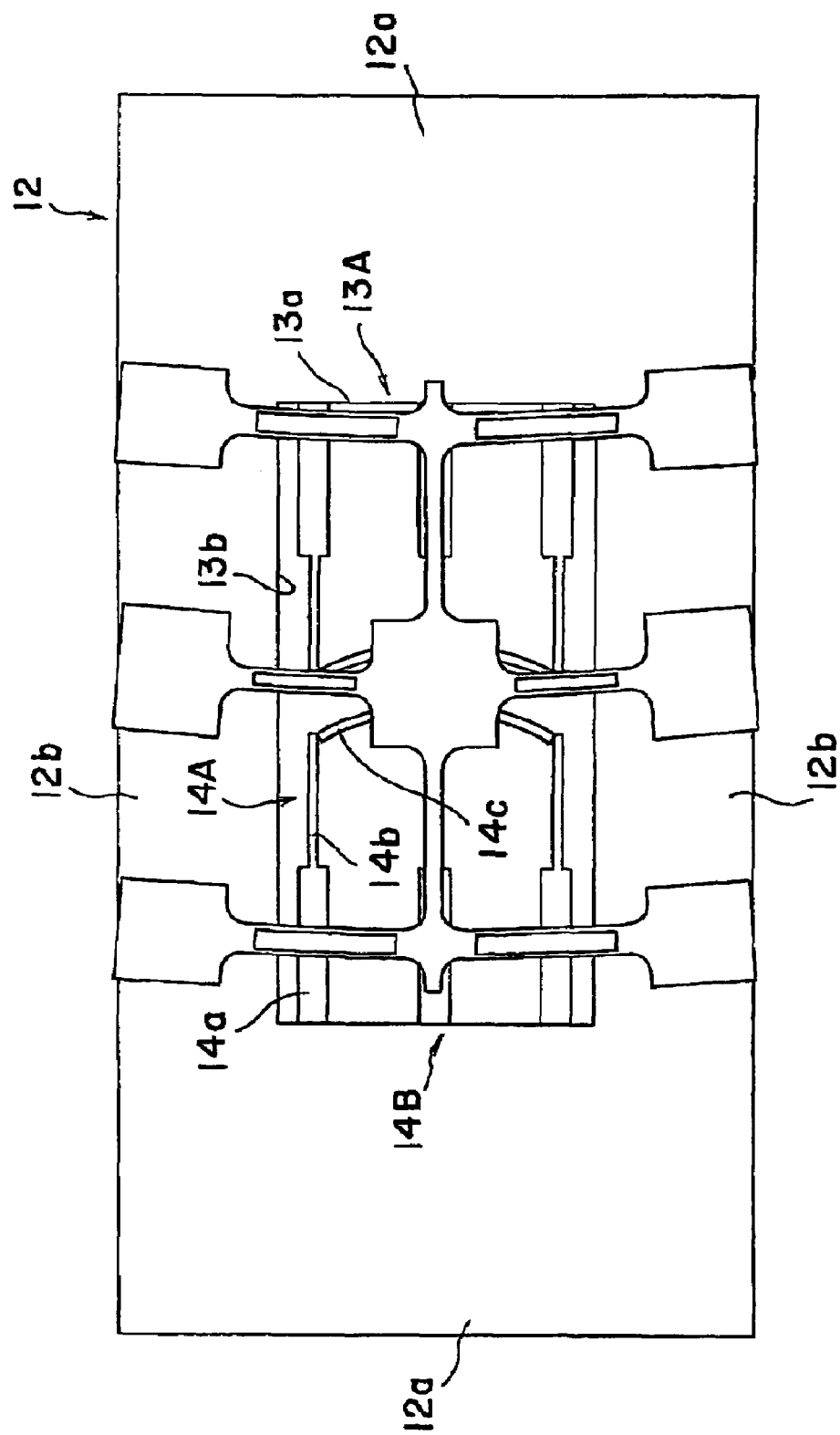
FIG. 7 is a plan view of an example of the vibration mode of a bonding wire in the supporting structure shown in FIG. 5.
Figure 8:
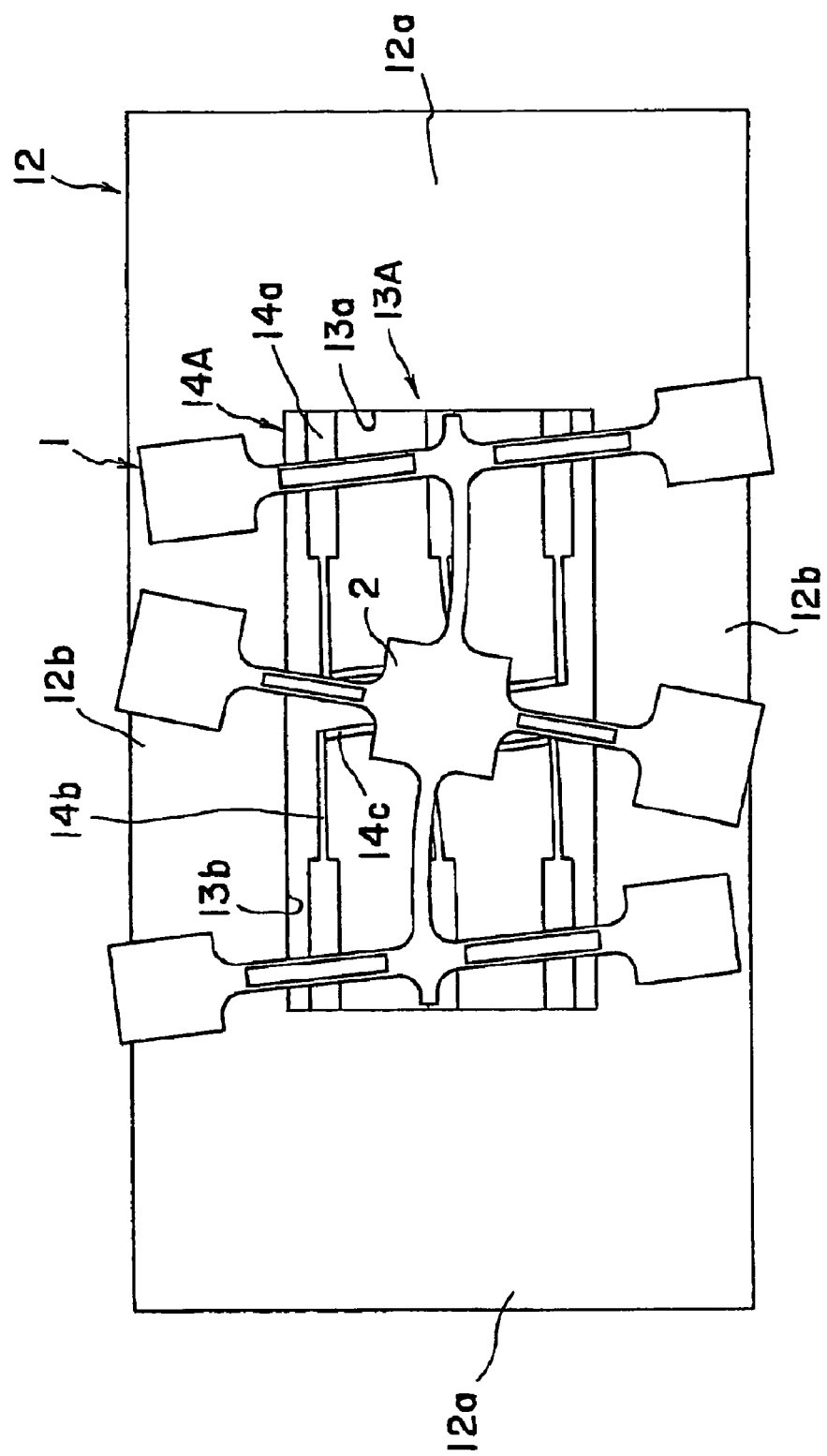
FIG. 8 is a plan view of an example of the vibration mode of a bonding wire in the supporting structure shown in FIG. 5.

FIGS. 7 and 8 show examples of vibration modes in which the characteristic frequency "fw" of the bonding wire tends to be close to "fd/2". The vibration modes shown in FIGS. 7 and 8 are relatively complex. The characteristic frequency "fw" of such complex vibration mode may be simulated at the time of the initial designing so that the characteristic frequency "fw" is made distant by 10 percent or more from "fd/2". It is thus possible to considerably reduce the zero point temperature drift. These kinds of findings are very useful in the actual design of a vibratory gyroscope.

Figure 9:
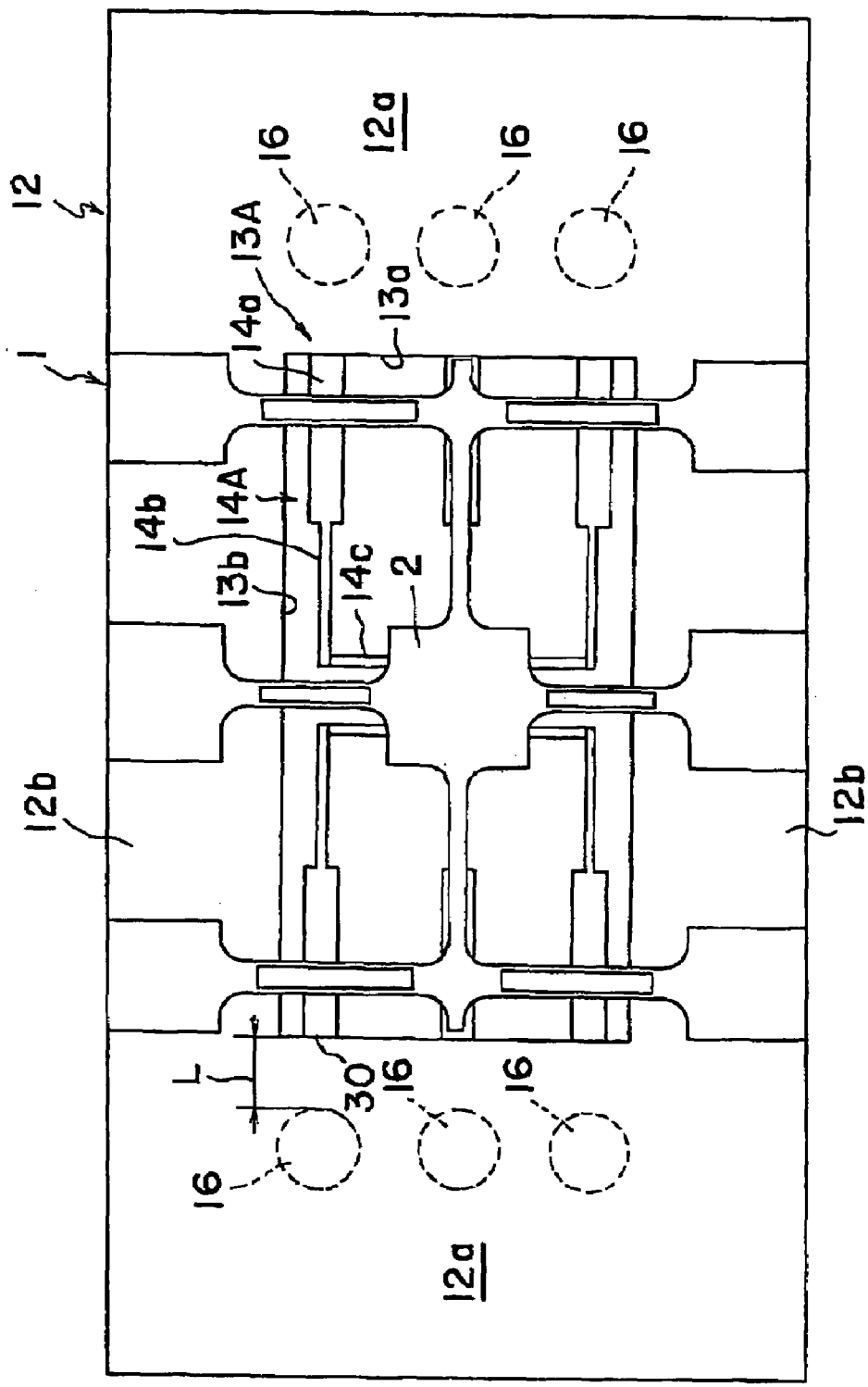
FIG. 9 is a plan view showing another supporting structure usable for the present invention.

Further, each bonding wire may be fixed to the substrate 12 at a position near the fixing point of the substrate to an underlying substrate such as a package, so that the above described zero point temperature drift can be further reduced FIG. 9 is a plan view schematically showing a supporting structure according to this embodiment of the present invention. In FIG. 9, parts already shown in FIG. 5 are represented by the same numerals and the explanation may be omitted. According to the example of FIG. 9, the supporting substrate 12 for a vibrator is fixed onto an underlying substrate at predetermined positions, for example six positions 16. Each position 16 and each contact point 30 of each bonding wire to the substrate 12 are made close with each other, so that the influences of the vibration of the bonding wire on the detection voltage can be reduced. Accordingly, the distance "L" between the fixing position 16 of the substrate 12 to the underlying substrate and the contact point 30 of the bonding wire to the substrate 12 may preferably be 0.6 mm or smaller and more preferably be 0.4 mm or smaller.

Figure 10:
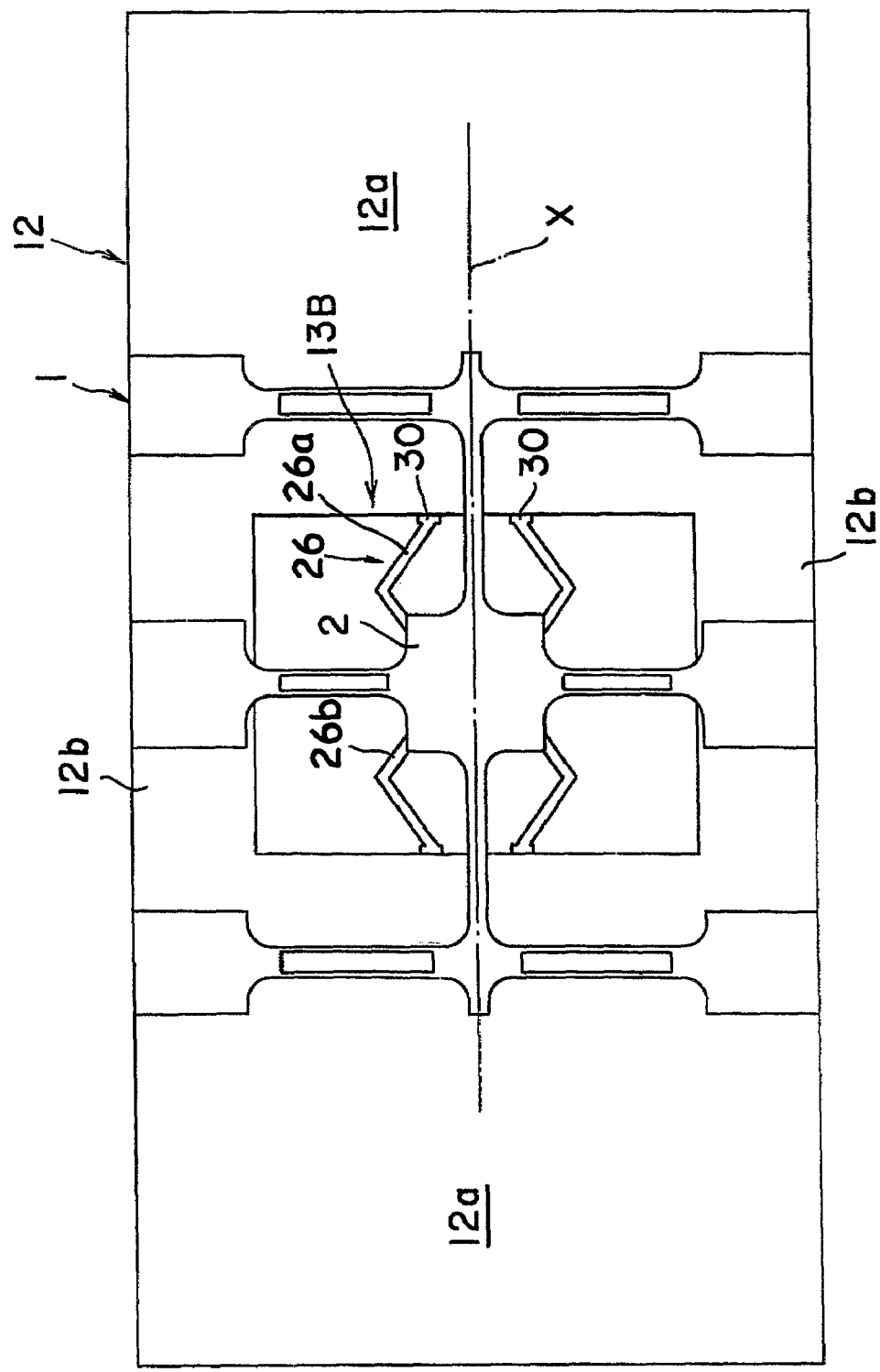
FIG. 10 is a plan view showing still another supporting structure usable for the present invention.

FIG. 10 is a plan view schematically showing a supporting structure according to still another embodiment of the present invention.

According to the present example, a bonding wire 26 is formed of bent portions 26a and 26b and the root of the portion 26b is made distant from a narrower non-fixed portion 12b and made close to X-axis, which is the central axis of the substrate 12. When the substrate 12 vibrates, the magnitude of the non-fixed portion 12b is particularly large. The contact point 30 of the bonding wire 26 from the substrate 12 is thus made distant from the narrower portion 12b and made close to the X-axis, so that the influences of the vibration of the substrate 12 on the bonding wire 26 and vibrator 1 can be effectively prevented.

Figure 11:
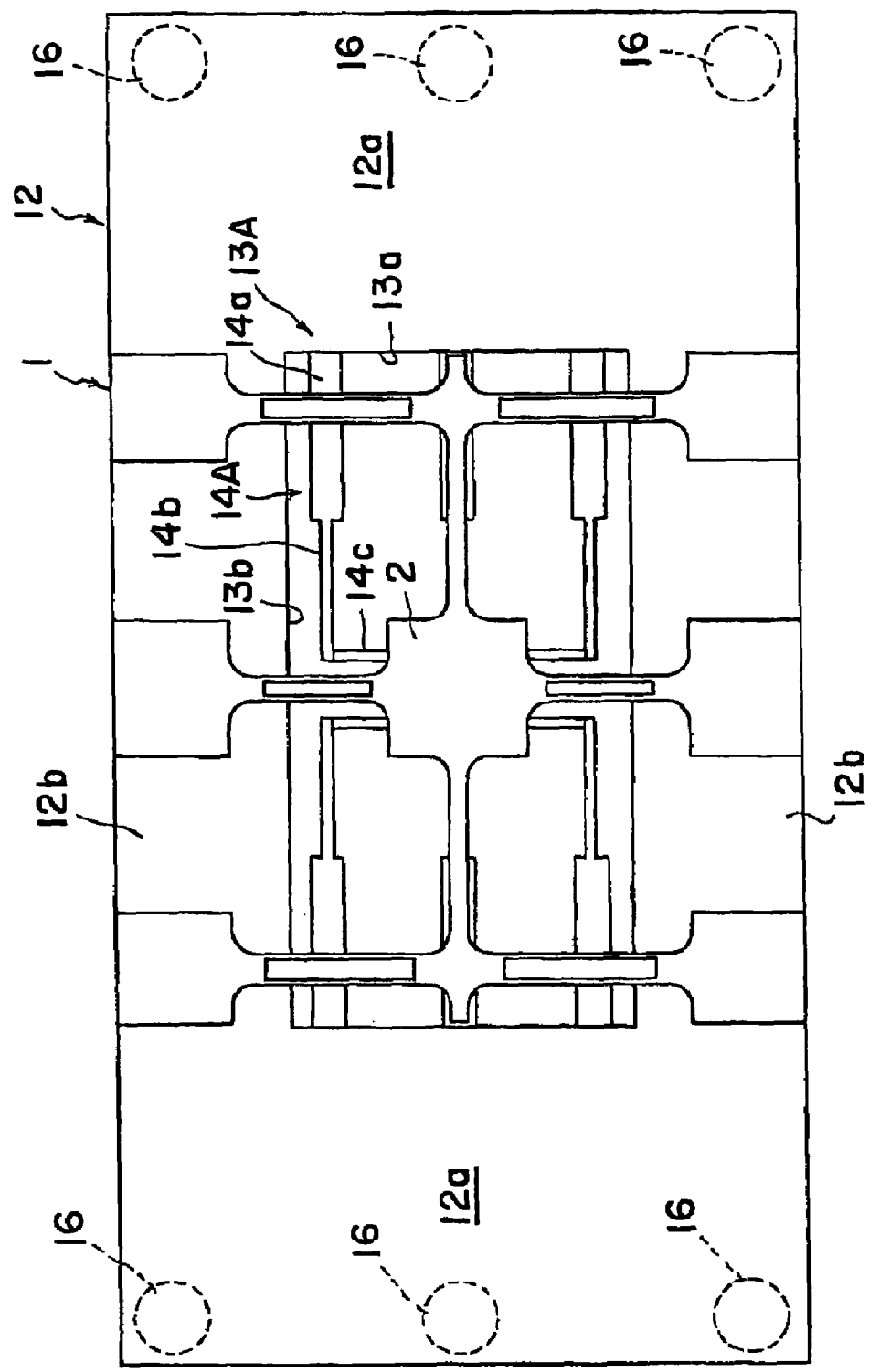
FIG. 11 is a plan view showing still another supporting structure usable for the present invention.
Figure 12:
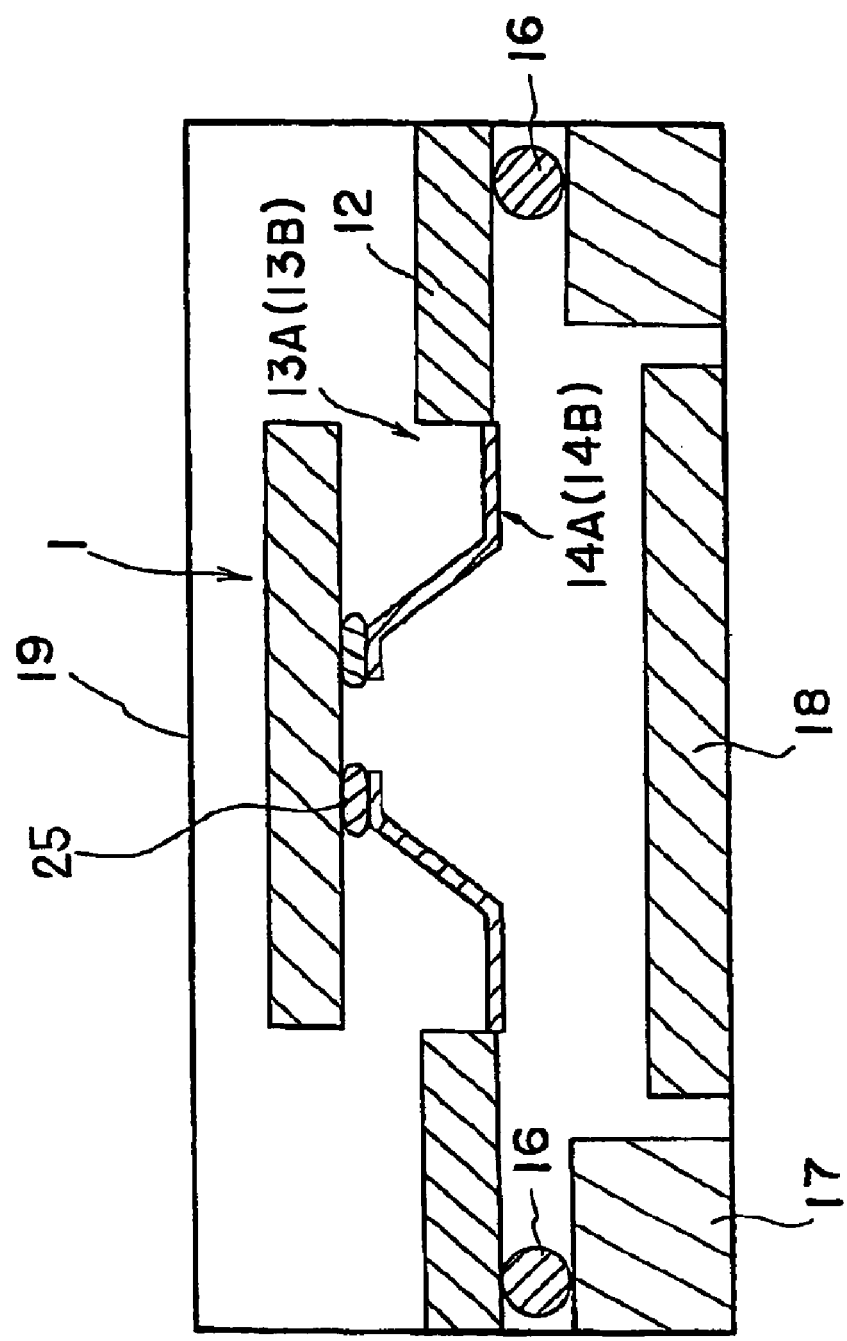
FIG. 12 is a cross sectional view schematically showing the supporting structure of FIG. 11.

According to an example of FIG. 11, both ends of a wider portion 12a of the substrate 12 is fixed onto the fixing position 16. The method of fixing is not particularly limited and may be adhesion with a conductive adhesive, welding or the like. Preferably, as schematically shown in FIG. 12, the vibrator 1, substrate 12 and bonding wires 14A (14B) are contained in a package 19 and a table 17 and an IC chip 18 are mounted thereon. The substrate 12 is mounted on the table 17 through the conductive adhesive of the fixing position 16, which is then heated to fix the substrate 12 onto the table 17 by adhesion.

Although the kind of the conductive adhesive is not particularly limited, carbon paste and noble metal pastes such as copper, silver, gold paste etc. may be listed.

Figure 13:
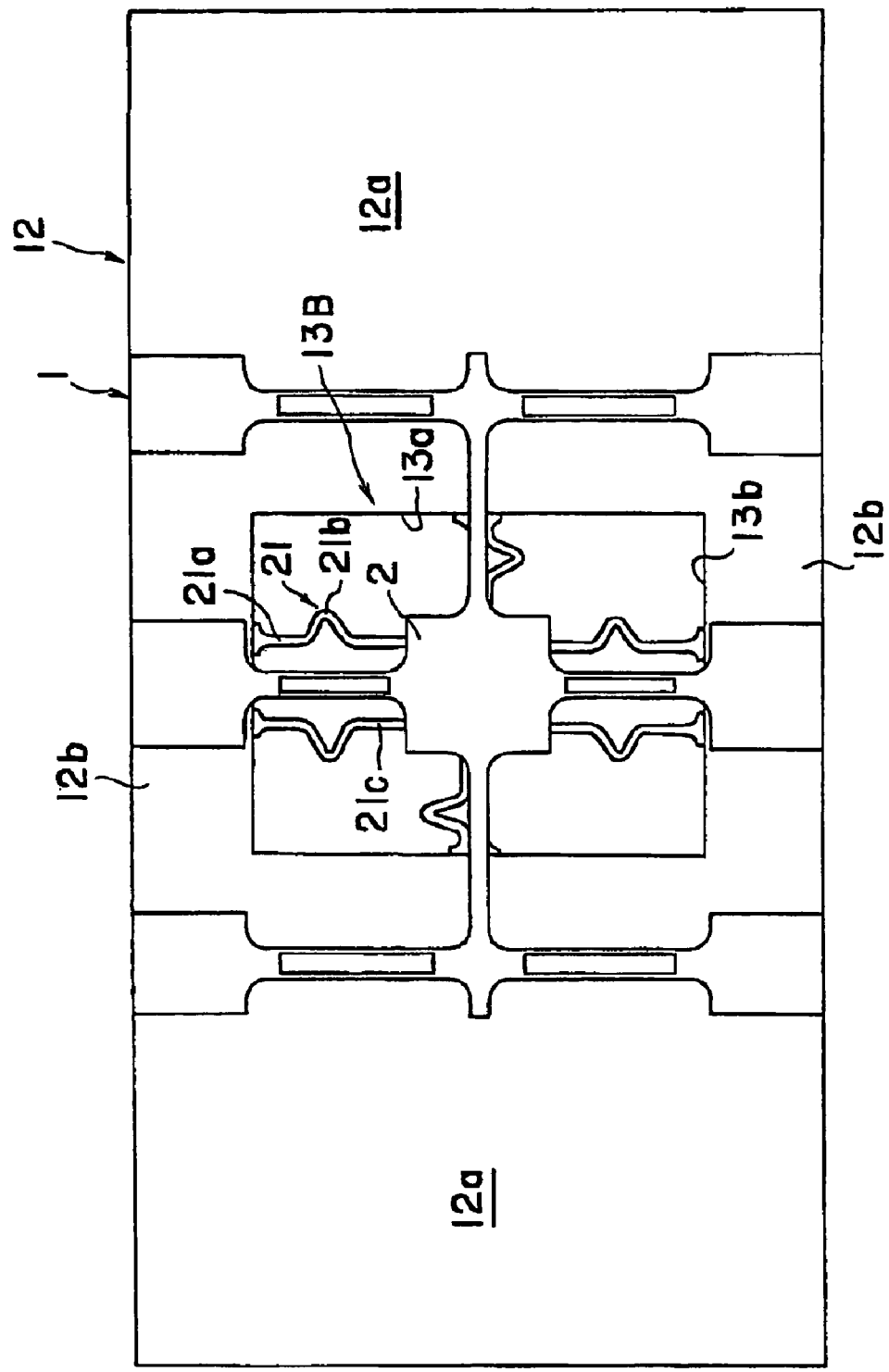
FIG. 13 is a plan view showing still another supporting structure usable for the present invention.

As far as the requirements of the present invention are satisfied, the fixed position of the bonding wire onto the substrate and the shape of the bonding wire are not particularly limited. For example, according to an example shown in FIG. 13, four bonding wires 21 are protruded from the opposing edges 13b, respectively, and two bonding wires 21 are protruded from the opposing edges 13a, respectively. Each bonding wire 21 has straight portions 21a, 21c and a curved portion 21b connecting them.

Figure 14:
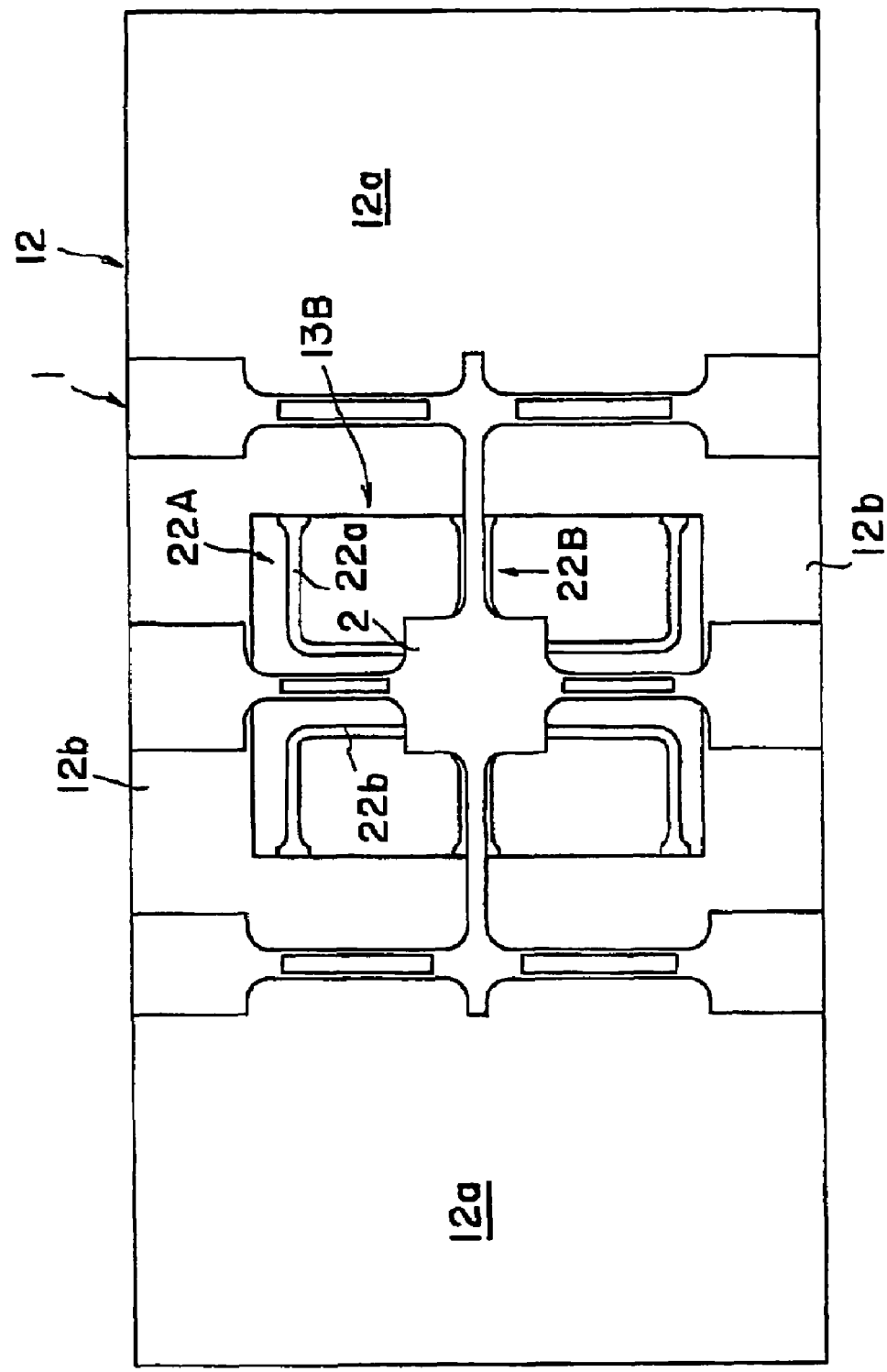
FIG. 14 is a plan view showing still another supporting structure usable for the present invention.

According to an example shown in FIG. 14, each of the bonding wires 22A and 22B has substantially the same shape as the bonding wire shown in FIG. 5. According to the present example, however, the width of a central through hole 13B of the substrate 12 is narrower than that shown in FIG. 5 and substantially has a planar shape of a square.

Figure 15:
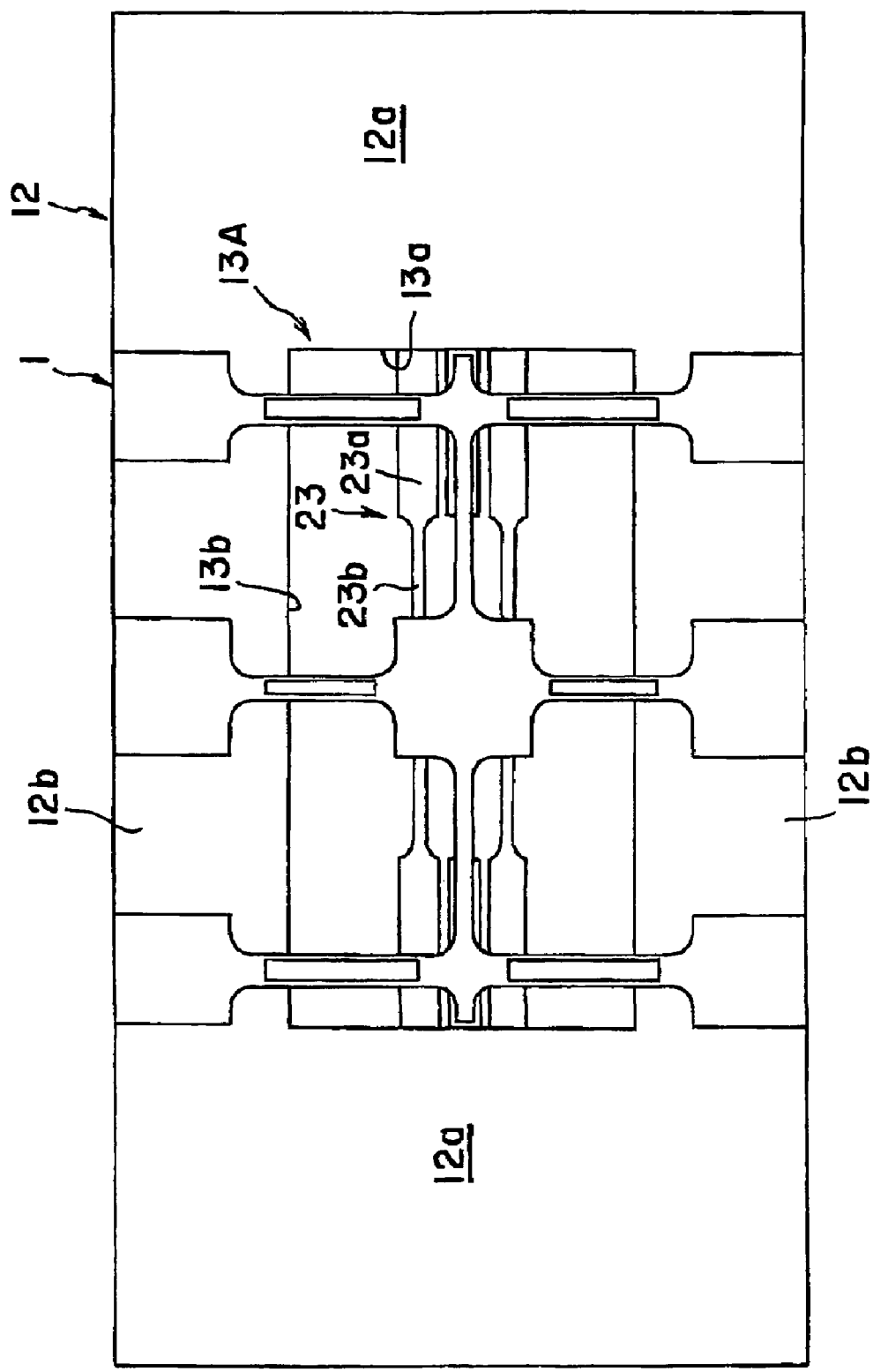
FIG. 15 is a plan view showing still another supporting structure usable for the present invention.

According to an example shown in FIG. 15, for example six bonding wires 23 are extended straightly from opposing edges 13a on the side of wider portions 12a into the through hole 13A Each bonding wire 23 has a wider portion 23a and a narrower portion 23b.

Figure 16:
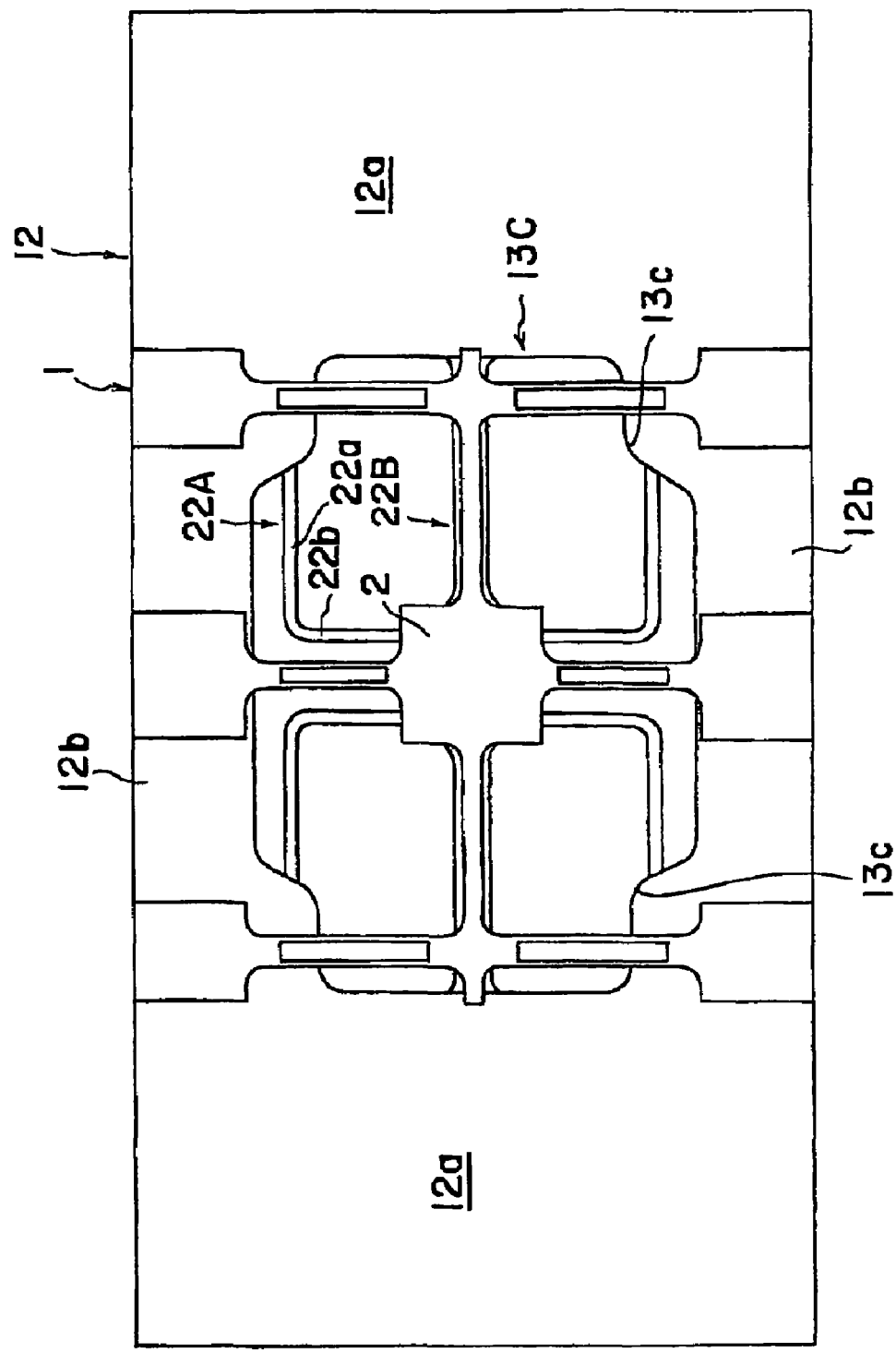
FIG. 16 is a plan view showing still another supporting structure usable for the present invention.

A supporting structure shown in FIG. 16 is basically the same as the supporting structure shown in FIG. 14. According to the present example, the shape of a central through hole 13C is basically rectangular except that curved profiles 13c are formed at the four corners of the rectangular shape, respectively. The shape of the through hole may be changed, as described above, to change the length of the bonding wire, so that the characteristic frequency thereof can be changed.

Figure 17:
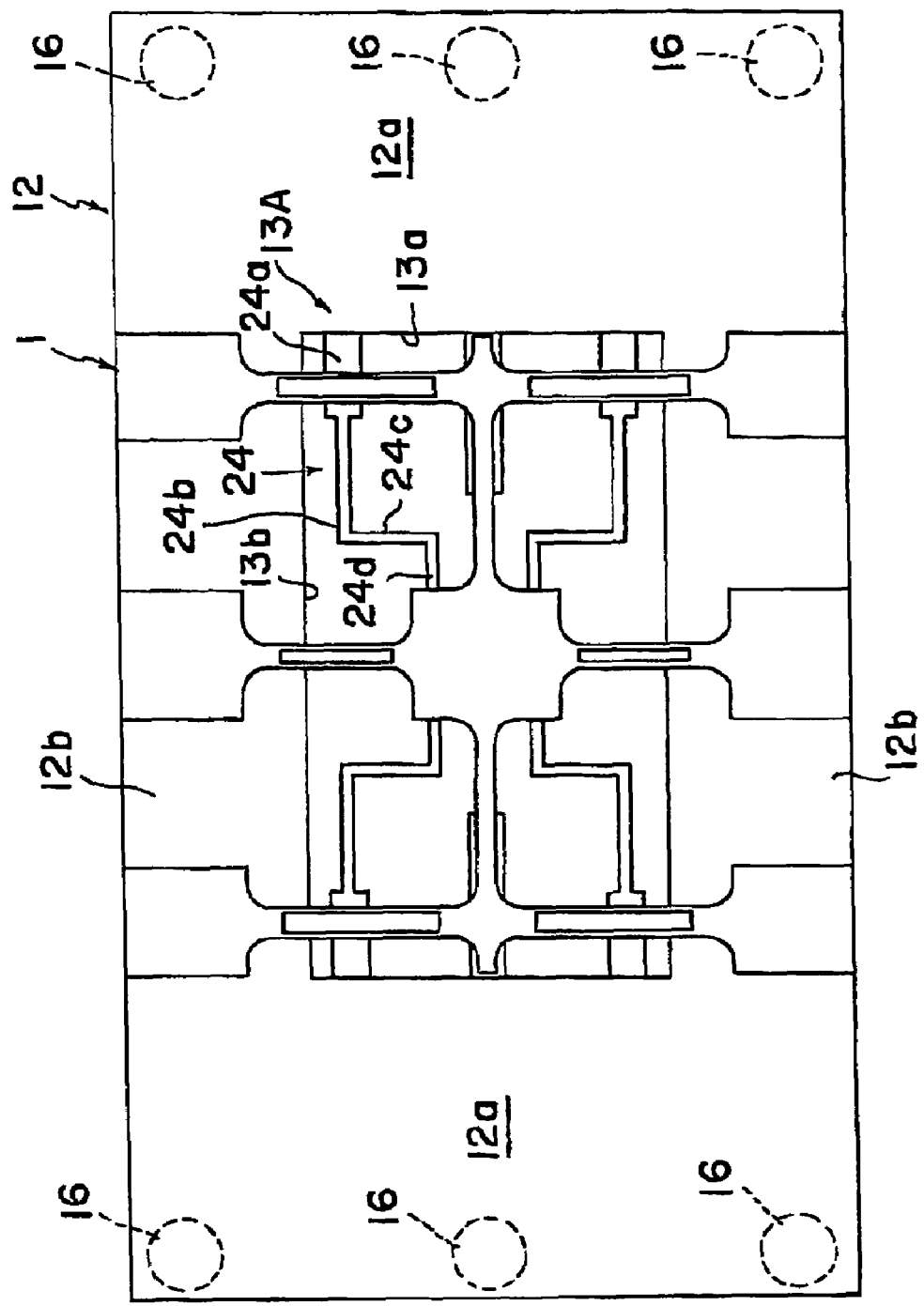
FIG. 17 is a plan view showing still another supporting structure usable for the present invention

According to an example shown in FIG. 17, a wire 24 of a shape of a crank is used instead of the wire 14A having a shape of "L" character shown in FIG. 5. The wire 24 has a wider portion 24a, a narrower portion 24b, a bent portion 24c protruding inside from the narrower portion 24b and an additional bent portion 24d. The characteristic frequency of vibration of the wire can be changed by increasing the number of bent portions thereof.

Figure 18:
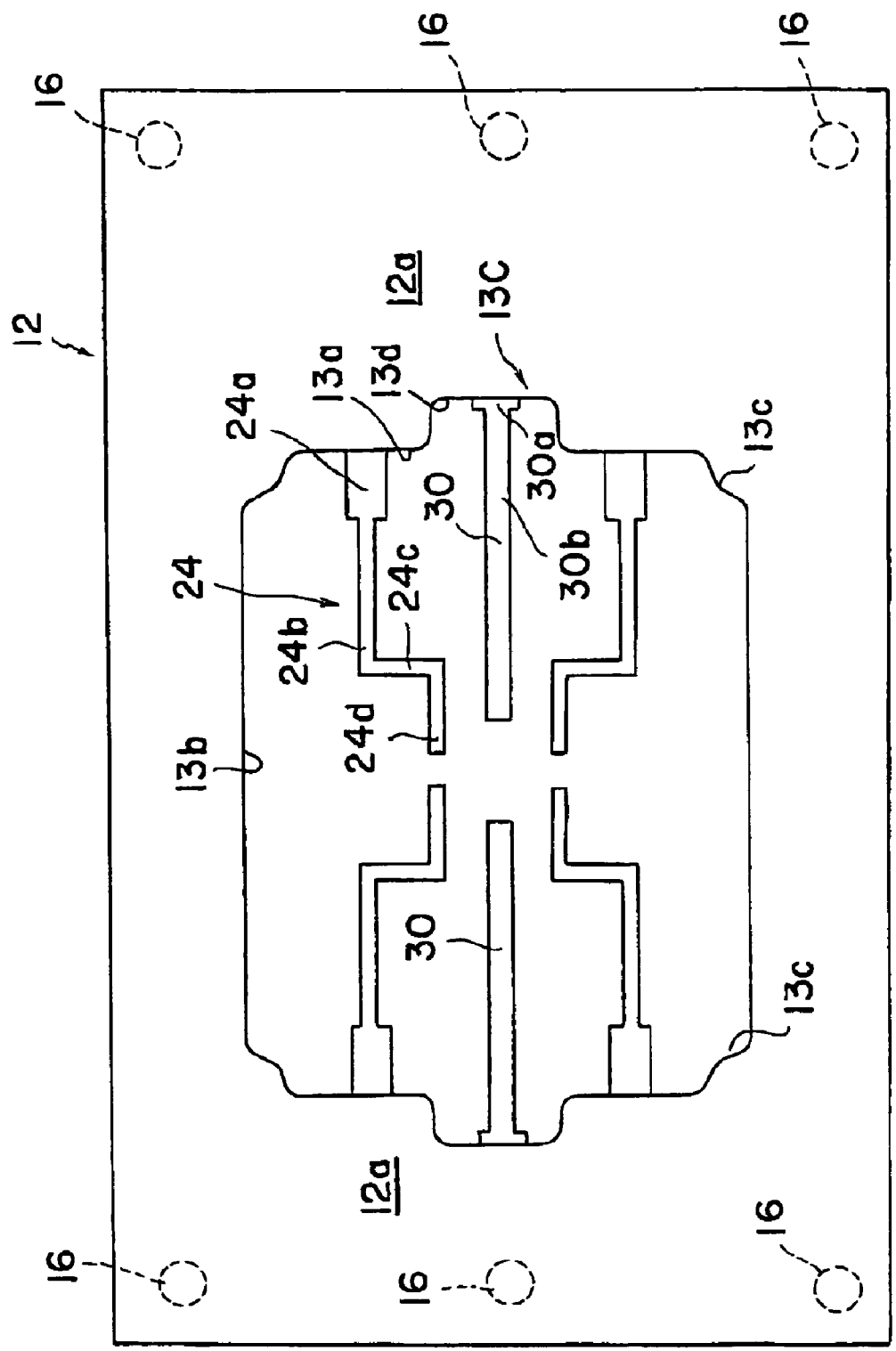
FIG. 18 is a plan view showing the shapes of a bonding wire and substrate usable for the present invention.

According to an example of FIG. 18, the shape of the central through hole 13C is substantially rectangular except that curved profiles 13c are formed at the four corners of the rectangular shape. Further, short edges 13a and 13d are provided to slightly reduce the length of the bonding wire 24 so that the bonding wire 30 is made slightly longer. Each bonding wire 24 having a shape of crank is protruded from the shorter edge 13a and has a wider portion 24a, a narrower portion 24b, a bent portion 24c protruding inside of the narrower portion 24b and an additional bent portion 24d. Each straight bonding wire 30 protrudes from the shorter edge 13d and has a wider portion 30a and a narrower portion 30b.

Figure 19:
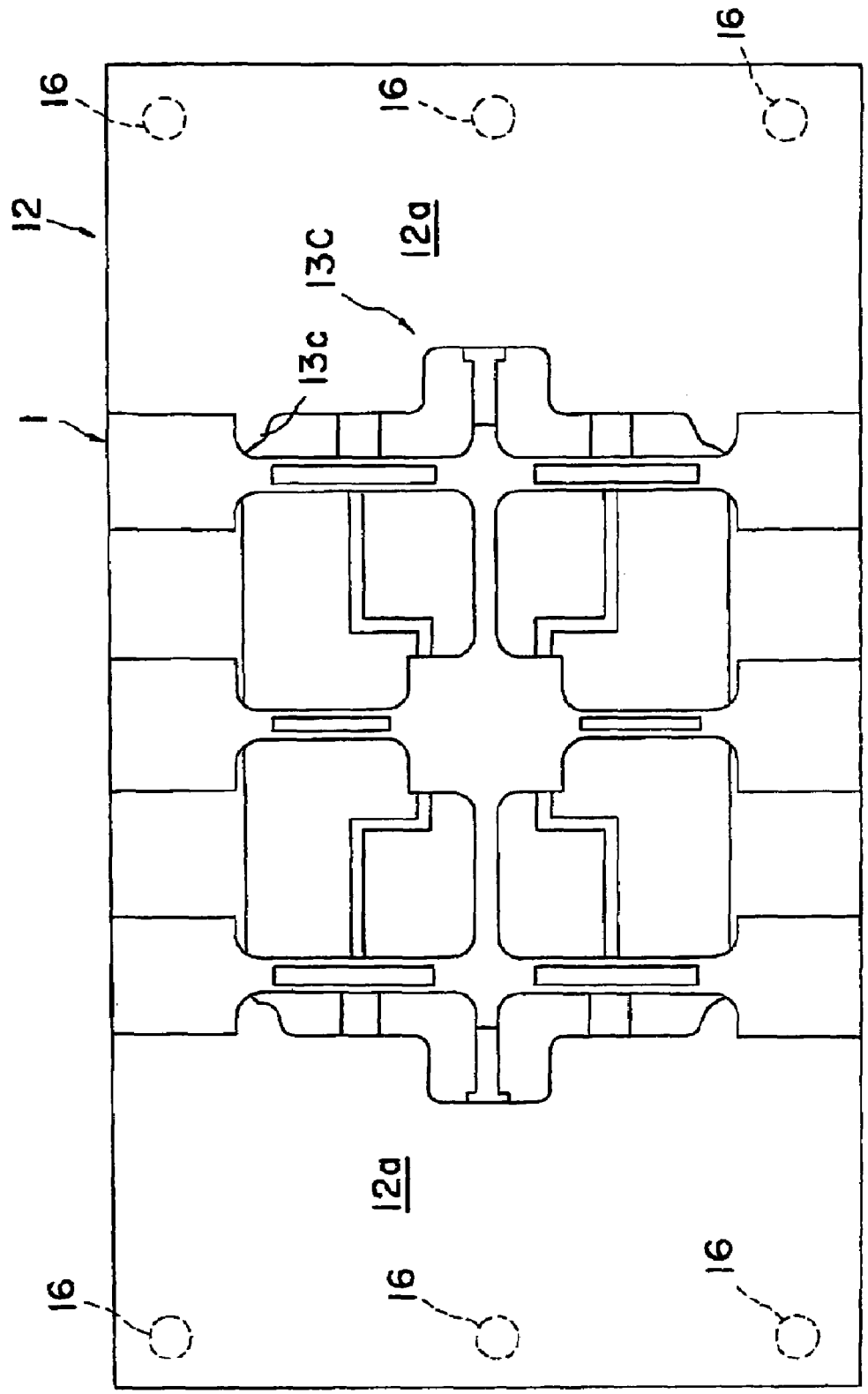
FIG. 19 is a plan view showing a vibrator supported on the substrate shown in FIG. 18.

FIG. 19 is a plan view showing a vibrator whose base portion is supported with six bonding wires shown in FIG. 18.

The end of each bonding wire may be joined with a terminal portion on the lower face of the vibrator, or, may be joined with a terminal portion on the upper face of the vibrator.

The dimensions of the vibrator are not particularly limited. However, if the weight or dimensions of the vibrator is too large, too much weight may be applied on the bonding wire to possibly deform the bonding wire over a long period of time. The width of the vibrator may preferably be not larger than 10 mm and more preferably be not larger than 5 mm for preventing adverse effects of the deformation of the bonding wire on the vibration. On this viewpoint, the weight of the vibrator may preferably be not larger than 5 mg and more preferably be not larger than 1 mg. Further, the thickness of the vibrator may preferably be not larger than 0.3 mm and more preferably be not larger than 0.2 mm.

The material for the substrate 12 is not particularly limited and may be an insulating material, used for a package, such a ceramics, glass or resin.

The bonding wire may be joined with the vibrator by means of a process not particularly limited, including bonding by heat pressing, ultrasonic bonding, spot welding, a conductive adhesive or soldering.

It is necessary to support the vibrator so that the vibrator does not directly contact the substrate for preventing the adverse effects on the vibration. According to a preferred embodiment, the distance between the vibrator and substrate is not smaller than 0.05 mm and more preferably is not smaller than 0.1 mm.

The material of the bonding wire is not particularly limited and may be a metal, resin, adhesive or a composite material of a metal and resin, and more preferably be a metal. Copper, gold, aluminum, silver, tungsten, stainless steel, iron, nickel, tin, brass, or the alloys thereof are most preferred.

These metal or alloys may be surface treated by plating or the like. For example, copper foil with gold plating is particularly preferred.

The material of the vibrator is not particularly limited, and may preferably be a piezoelectric single crystal. The material may more preferably be a piezoelectric single crystal selected from the group consisting of quartz, lithium niobate, lithium tantalate, lithium niobate-lithium tantalate solid solution, lithium borate and langasite.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical value can be detected through a detection circuit. Such physical quantity may preferably be an acceleration, an angular acceleration or an angular velocity applied on a vibrator. The measuring system of the present invention may preferably be an inertia sensor.

EXAMPLES

Comparative Example 1

The vibrator 1A shown in FIGS. 1 and 2 was used. Specifically, a chromium film of 100 angstroms in thickness and a gold film of 1500 angstroms in thickness were formed in predetermined regions on a wafer made of a Z-plate of quartz with a thickness of 0.1 mm, by sputtering. Both main faces of the wafer were coated with resist films, respectively.

The wafer was then immersed in aqueous solution of iodine and potassium iodide to remove excessive gold in the gold film by etching, and was further immersed in aqueous solution of cerium-ammonium nitrate and perchloric acid to remove excessive chromium in the chromium film by etching. The wafer was etched by immersing the wafer in ammonium bifluoride at a temperature of 80° C. for 20 hours to form the external shape of the vibrator 1. A gold film having a thickness of 2000 angstrom is formed as a film for electrode on the chromium film having a thickness of 100 angstrom using a metal mask The vibrator 1 had a length of 2.0 mm, a width of 2.2 mm, a thickness of 0.1 mm and a weight of about 0.3 mg.

The vibrator 1 was mounted in a package as shown in FIG. 12. The substrate 12 was formed of a joined body of a polyimide film and copper foil having a central through hole. The copper foil was etched to form the bonding wires, wirings and contact pads on the substrate 12. The frame was formed of alumina ceramics. The surface of the copper foil was covered with gold plating. The bonding wires were joined with the base portion 2 of the vibrator 1 through gold bump 25 by means of bonding by heat pressing.

According to the present example, each of the bonding wires had a shape shown in FIG. 15 and the width of 0.03 mm. The vibrator was supported with six bonding wires.

The thus obtained vibratory gyroscope was contained in a temperature test bath and the temperature was changed in a range of minus 40 to plus 85° C. The driving vibration was excited using a self-oscillation circuit so that the resonance frequency "fd" of the driving vibration mode was changed as shown in table 1. Further, the characteristic frequency "fw" of the bonding wire supporting the vibrator was shown in table 1.

Figure 3:
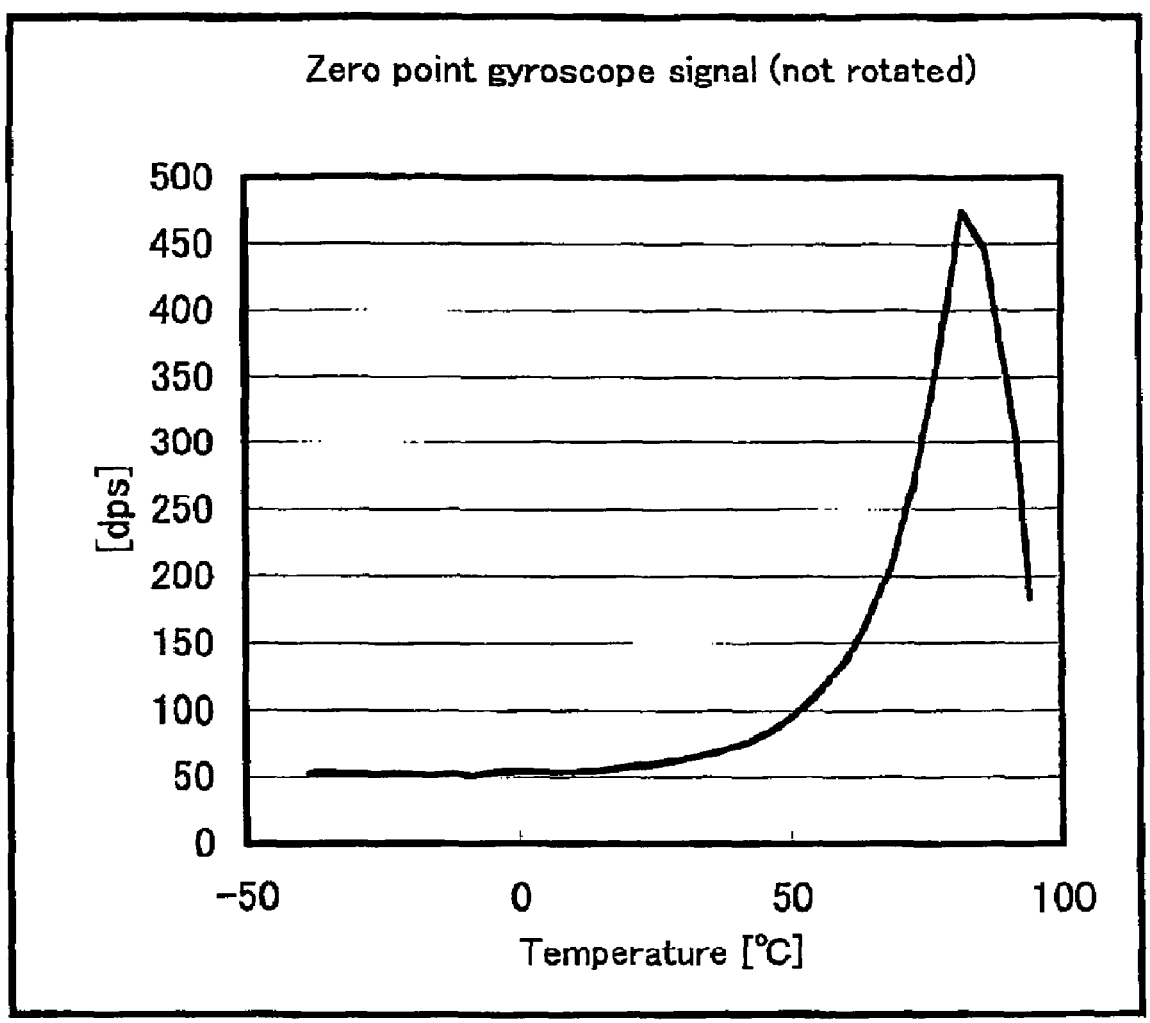
FIG. 3 is a graph showing the relationship of the zero point gyro component and temperature in a comparative example.

The thus obtained detection signal was processed to draw a zero point gyroscope signal. It was thus proved that a peak zero point temperature drift was detected in a range of 60 to 85° C., as shown in FIG. 3.

The zero point temperature drift was calculated as follows. The data of the zero point gyroscope signal was plotted as a function of temperature to provide a graph. The graph excluding the peak was approximated by a straight line in a range of minus 40 to plus 85° C. The height of the peak with respect to the straight line was calculated and assigned to the zero point temperature drift.

TABLE 1

| | fd (Hz) | Magnitude of (fw) to (fd/2) | Magnitude of (fw) to (2 fd) | Magnitude of (fw) to (3 fd) | Zero point Temperature Drift | Figures |
|---|---|---|---|---|---|---|
| Comparative Example 1 | 45000 | 1.03 | 0.85 | 0.88 | 370 | Note 1 |
| Example 1 | 51000 | 0.71 | 0.79 | 0.82 | 2.5 | FIG. 17 |
| Example 2 | 44800 | 0.9 | 0.99 | 0.93 | 20 | FIG. 15 |
| Example 3 | 45500 | 1.16 | 0.84 | 1.03 | 5 | FIG. 5 |
| Example 4 | 50900 | 0.88 | 1.24 | 1.11 | 4 | FIG. 6 |
| Example 5 | 51100 | 0.89 | 1.25 | 1.19 | 4 | FIG. 10 |

Note 1
FIG. 15, Width of bonding wire was uniform and 0.03 mm.

Example 1

Figure 4:
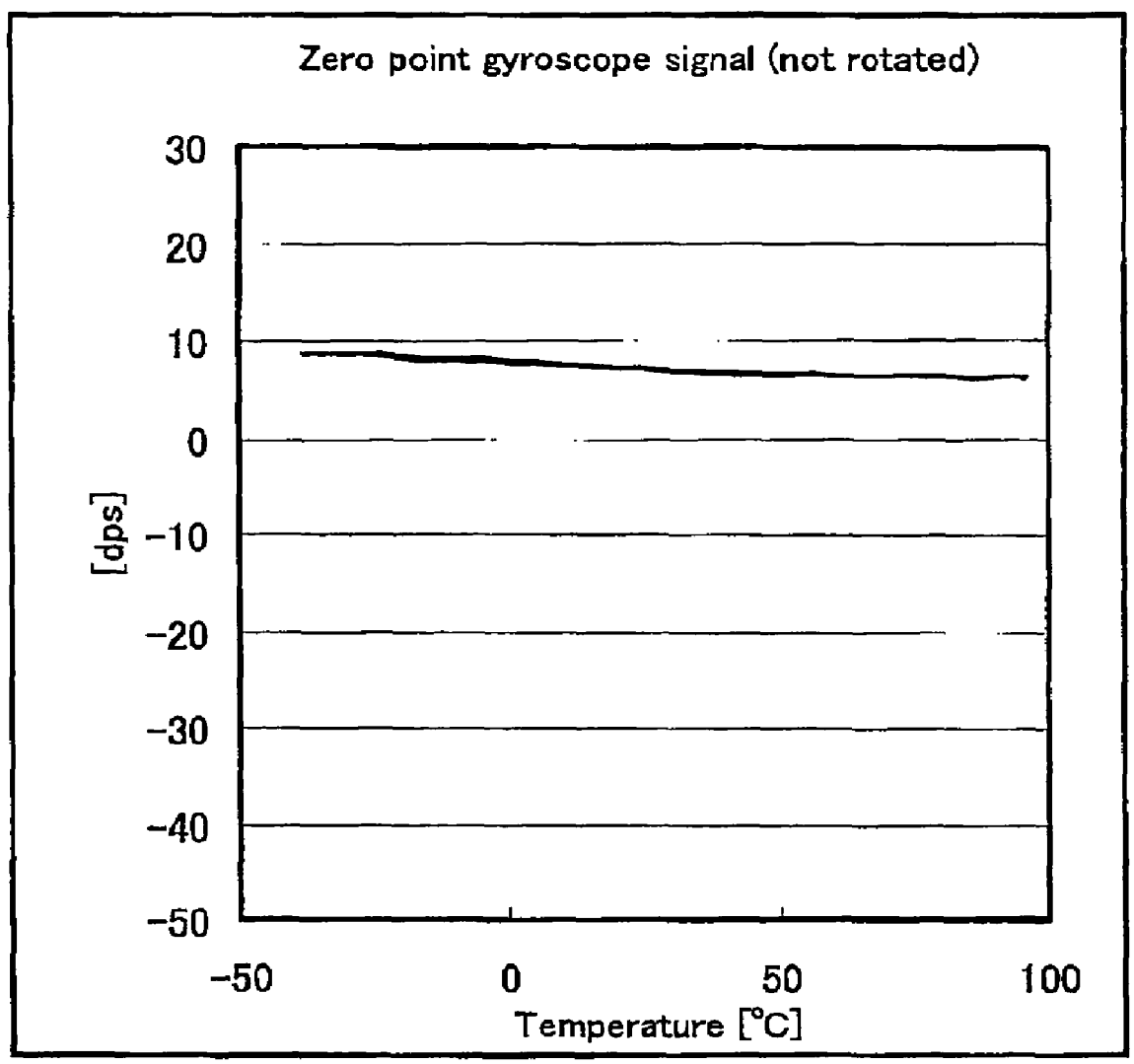
FIG. 4 is a graph showing the relationship of the zero point gyro component and temperature in an example according to the present invention.

The vibrator 1 was supported on the substrate according to the same procedure as the comparative example 1, except that the supporting structure shown in FIG. 17 was applied. The numerical values of "fd" and "fw" were shown in table 1. As a result, the dependency of the zero point gyroscope signal component on temperature was shown in FIG. 4. That is, the zero point gyroscope signal component was gradually lowered substantially according to a linear function between minus 40 to plus 85° C. and a particular zero point temperature drift was not observed.

Example 2

Figure 20:
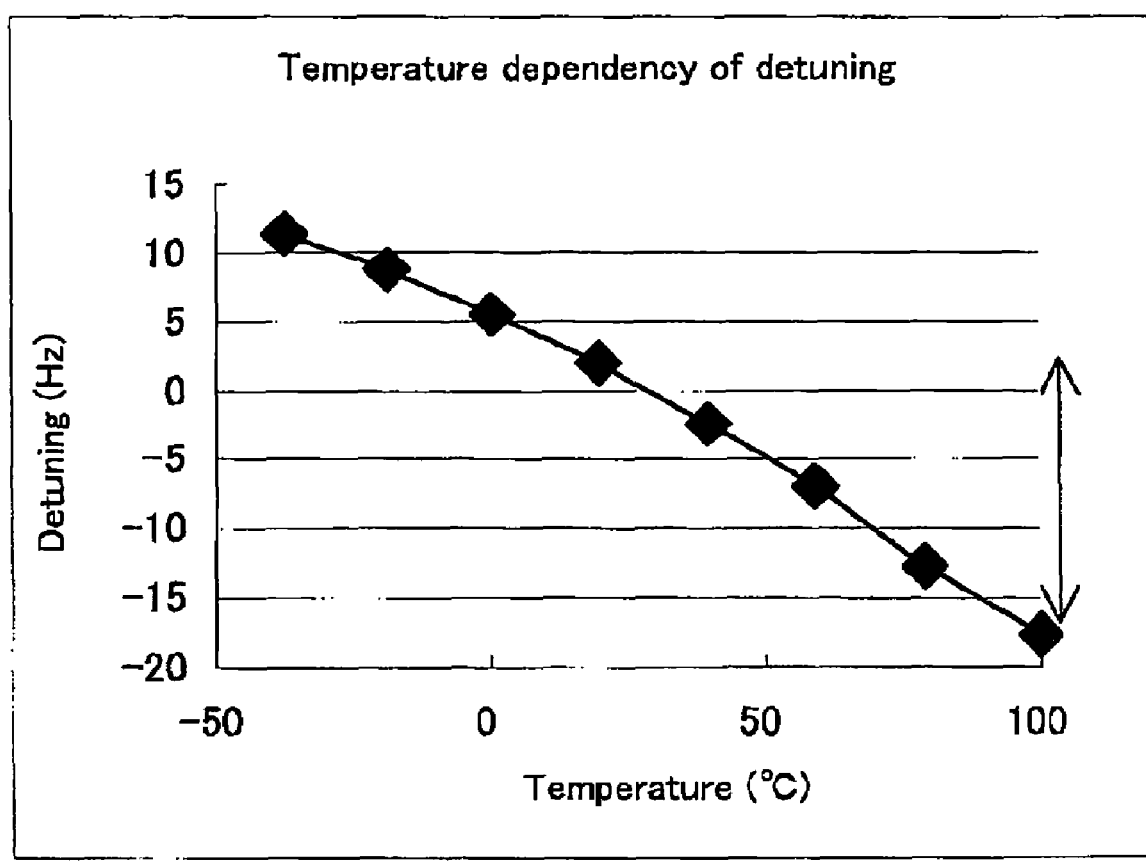
FIG. 20 is a graph showing the temperature change of detuning according to the example of the present invention.
Figure 22:
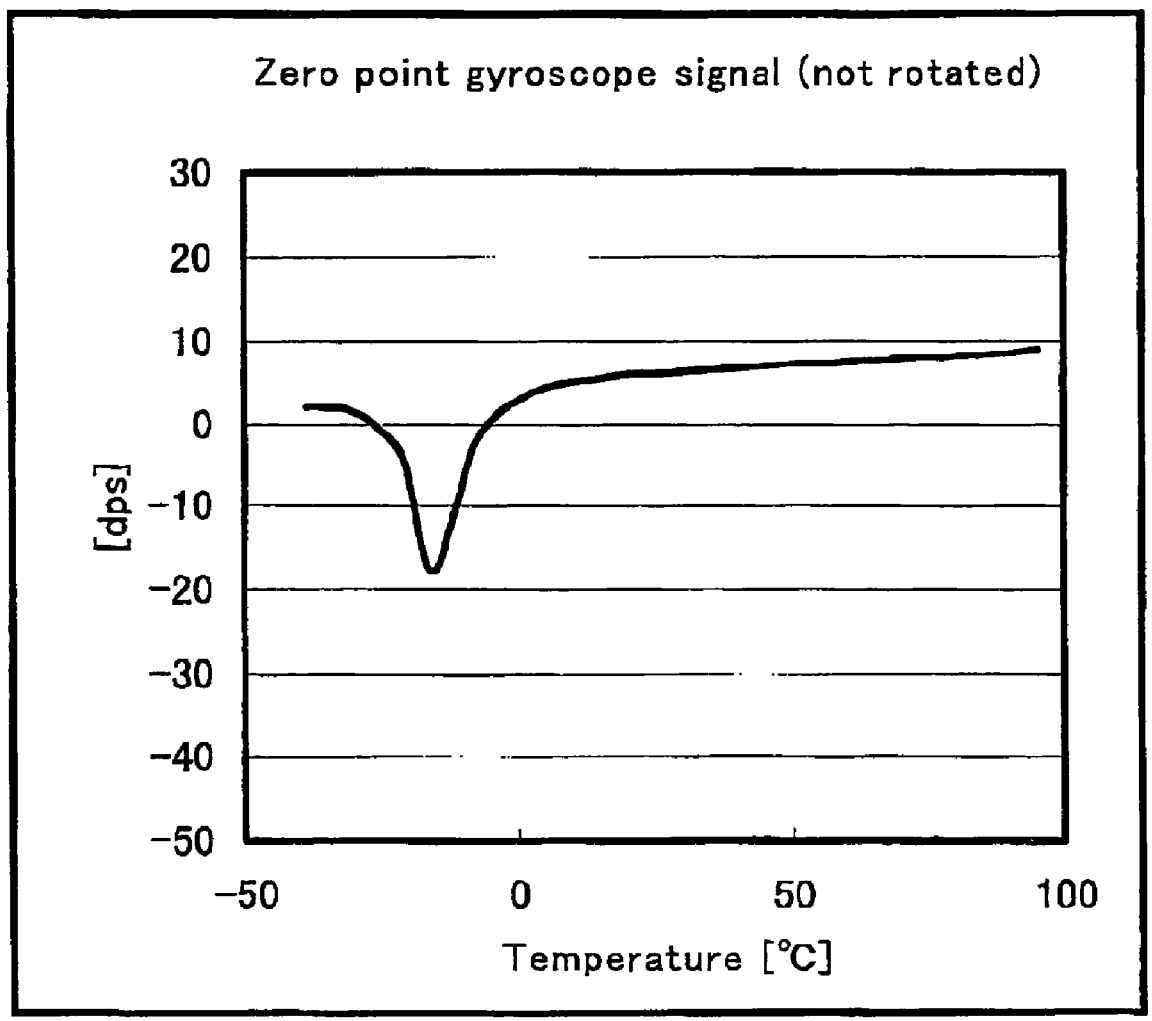
FIG. 22 is a chart showing the zero point temperature drift in example 2.

The vibrator 1 was supported on the substrate according to the same procedure as the comparative example 1, except that the supporting structure shown in FIG. 15 was applied The numerical values of "fd" and "fw" were shown in table 1. As a result, a peak of zero point temperature drift was detected in a range of minus 40 to 0° C., as shown in FIG. 22. The temperature drift was considered to be due to resonance of vibration of "2fd". Further, according to the Example 2, the amount of drift was considerably reduced compared with that of the comparative example, and the detuning frequency was changed substantially according to a linear function with respect to temperature in a range of minus 40 to plus 85° C., as shown in FIG. 20.

Example 3

Figure 21:
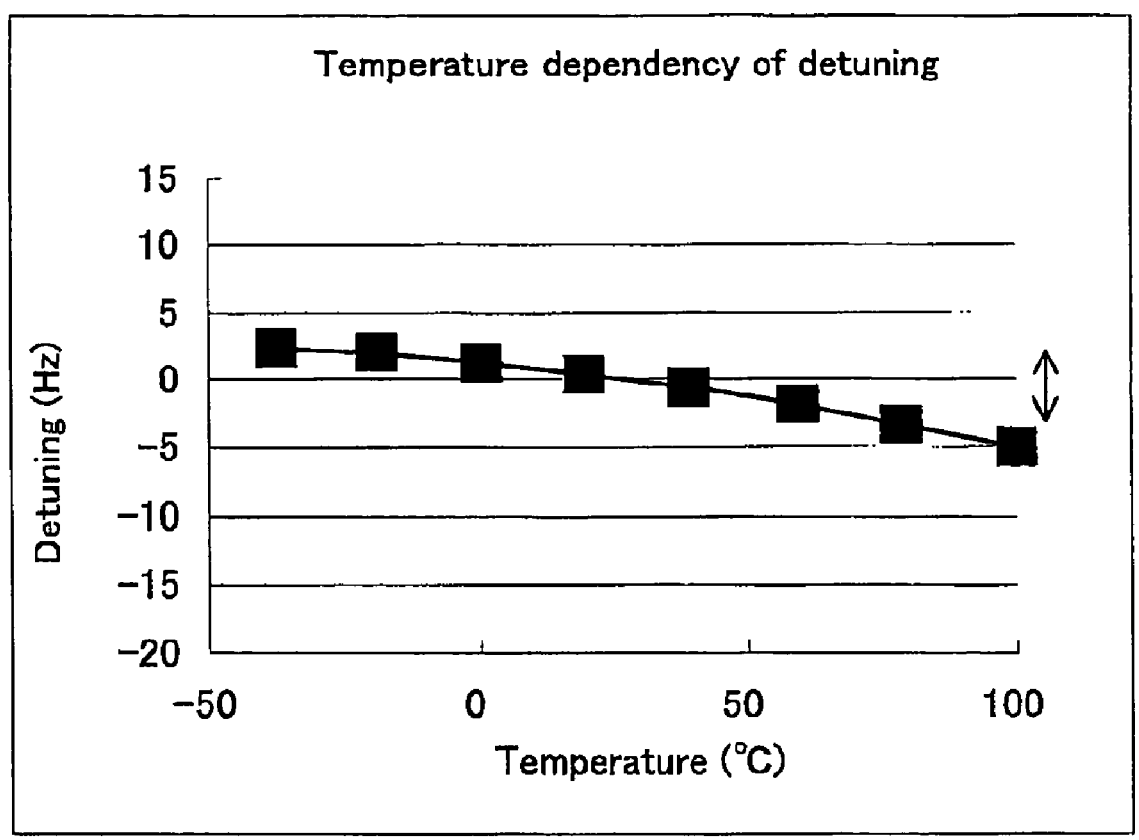
FIG. 21 is a graph showing the temperature change of detuning according to the example of the present invention.
Figure 23:
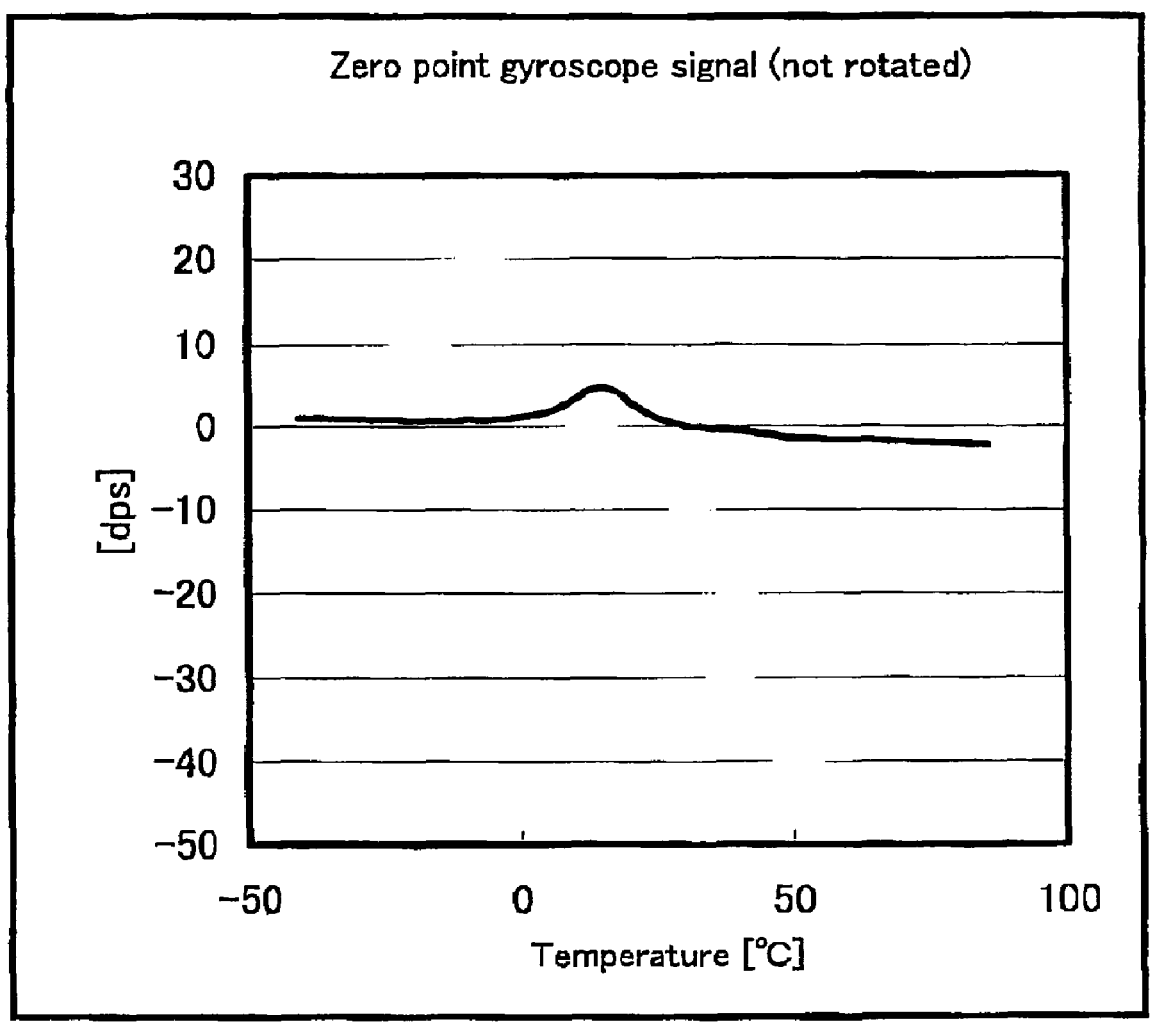
FIG. 23 is a chart showing the zero point temperature drift in example 3.

The vibrator 1 was supported on the substrate according to the same procedure as the comparative example 1, except that the supporting structure shown in FIG. 5 was applied. As a result, a peak of zero point temperature drift was detected as shown in FIG. 23 in a range of 0° C. to 30° C. The temperature drift is considered to be due to resonance of "3fd". Further, according to the Example 3, the amount of d was considerably reduced compared with that of the comparative example, and the detuning frequency was gradually changed according to a linear function with respect to temperature in a range of minus 40 to plus 85° C., as shown in FIG. 21.

Example 4

The vibrator 1 was supported on the substrate according to the same procedure as the comparative example 1, except that the supporting structure shown in FIG. 6 was applied. The zero point gyroscope signal was gradually changed according to a linear function and the amount of zero point temperature drift was considerably reduced compared with that of the comparative example.

Example 5

The vibrator 1 was supported on the substrate according to the same procedure as the comparative example 1, except that the supporting structure shown in FIG. 10 was applied. The zero point gyroscope signal was gradually changed according to a linear function and the amount of zero point temperature drift was considerably reduced compared with that of the comparative example.

The present invention has been explained referring to the preferred embodiments, however, the present invention is not limited to the illustrated embodiments which are given by way of examples only, and may be carried out in various modes without departing from the scope of the invention.

The invention claimed is:

1. A structure for supporting a vibrator, said structure comprising:
    a substrate; and a pair of bonding wires fixed to said substrate and connected with said vibrator, said bonding wires being aligned substantially along a central axis of the substrate, each of said bonding wires comprising a wider portion and a narrower portion, said wider portion being directly connected to said substrate and said narrower portion being directly connected to said vibrator, wherein said vibrator is supported with said bonding wires so that said vibrator is not directly contacted with said substrate, and wherein "fd" and "fw" satisfy the following formulas (1), (2) and (3), provided that "fd" represents a resonance frequency of a driving vibration mode of said vibrator and "fw" represents a characteristic frequency of a vibration mode of said bonding wires at room temperature $$(fd/2) \times 1.05 \leq fw, \text{ or } fw \leq (fd/2) \times 0.95 \quad (1)$$

$$(2fd) \times 1.03 \leq fw, \text{ or } fw \leq (2fd) \times 0.97 \quad (2)$$

$$(3fd) \times 1.05 \leq fw, \text{ or } fw \leq (3fd) \times 0.95 \quad (3).$$

2. The structure of claim 1, further comprising an underlying substrate fixed to the substrate at predetermined positions, each predetermined position being located respective to a contact point of the bonding wire to the substrate at a distance from the bonding wire contact point of not more than 0.6 mm.

3. A device for measuring a physical quantity comprising a structure for supporting a vibrator, said structure comprising:

a substrate; and a pair of bonding wires fixed to said substrate and connected with said vibrator, said bonding wires being aligned substantially along a central axis of the substrate, each of said bonding wires comprising a wider portion and a narrower portion, said wider portion being directly connected to said substrate and said narrower portion being directly connected to said vibrator, wherein said vibrator is responsive to a physical quantity and is supported with said bonding wires so that said vibrator is not directly contacted with said substrate, and wherein "fd" and "fw" satisfy the following formulas (1), (2) and (3), provided that "fd" represents a resonance frequency of a driving vibration mode of said vibrator and "fw" represents a characteristic frequency of a vibration mode of said bonding wires at room temperature $$(fd/2) \times 1.05 \leq fw, \text{ or } fw \leq (fd/2) \times 0.95 \quad (1)$$

$$(2fd) \times 1.03 \leq fw, \text{ or } fw \leq (2fd) \times 0.97 \quad (2)$$

$$(3fd) \times 1.05 \leq fw, \text{ or } fw \leq (3fd) \times 0.95 \quad (3).$$

4. The device of claim 3, further comprising an underlying substrate fixed to the substrate at predetermined positions, each predetermined position being located respective to a contact point of the bonding wire to the substrate at a distance from the bonding wire contact point of not more than 0.6 mm.

5. A vibratory gyroscope comprising a device for measuring a physical quantity, said device comprising a structure for supporting a vibratory gyroscope, said structure comprising:

a substrate; and a pair of bonding wires fixed to said substrate and connected with said vibratory gyroscope, said bonding wires being aligned substantially along a central axis of the substrate, each of said bonding wires comprising a wider portion and a narrower portion, said wider portion being directly connected to said substrate and said narrower portion being directly connected to said vibratory gyroscope, wherein said vibratory gyroscope is supported with said bonding wires so that said vibratory gyroscope is not directly contacted with said substrate, and wherein "fd" and "fw" satisfy the following formulas (1), (2) and (3), provided that "fd" represents a resonance frequency of a driving vibration mode of said vibratory gyroscope and "fw" represents a characteristic frequency of a vibration mode of said bonding wires at room temperature $$(fd/2) \times 1.05 \leq fw, \text{ or } fw \leq (fd/2) \times 0.95 \quad (1)$$

$$(2fd) \times 1.03 \leq fw, \text{ or } fw \leq (2fd) \times 0.97 \quad (2)$$

$$(3fd) \times 1.05 \leq fw, \text{ or } fw \leq (3fd) \times 0.95 \quad (3).$$

6. The vibratory gyroscope of claim 5, further comprising an underlying substrate fixed to the substrate at predetermined positions, each predetermined position being located respective to a contact point of the bonding wire to the substrate at a distance from the bonding wire contact point of not more than 0.6 mm.

* * * * *